United States Patent
Furuya et al.

(10) Patent No.: US 6,322,166 B1
(45) Date of Patent: Nov. 27, 2001

(54) SOLENOID VALVE CONTROL APPARATUS AND BRAKE CONTROL APPARATUS

(75) Inventors: Takayuki Furuya; Yukio Sudou; Shinobu Kakizaki; Jyunichi Emura; Norihiro Saita; Toshihiko Seki; Katsuya Iwasaki, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/646,534

(22) PCT Filed: Jan. 19, 2000

(86) PCT No.: PCT/JP00/00221

§ 371 Date: Sep. 19, 2000

§ 102(e) Date: Sep. 19, 2000

(87) PCT Pub. No.: WO00/44007

PCT Pub. Date: Jul. 27, 2000

(30) Foreign Application Priority Data

Jan. 20, 1999 (JP) .................................................. 11-11420

(51) Int. Cl.[7] ..................................................... B60T 8/36
(52) U.S. Cl. .................................. 303/119.2; 251/129.05; 303/152
(58) Field of Search ............................. 303/119.3, 119.2, 303/115.2, 152; 251/129.05, 129.15

(56) References Cited

U.S. PATENT DOCUMENTS

| | | | |
|---|---|---|---|
| 5,660,449 | 8/1997 | Higashimata et al. | 303/156 |
| 5,839,800 | * 11/1998 | Koga et al. | 303/152 |
| 5,915,799 | * 6/1999 | Bourlon et al. | 303/119.2 |
| 6,019,441 | * 2/2000 | Lloyd et al. | 303/156 |
| 6,050,654 | * 4/2000 | Gegalski et al. | 303/119.2 |
| 6,155,654 | * 12/2000 | Oyama | 303/119.2 |

FOREIGN PATENT DOCUMENTS

| | | |
|---|---|---|
| 55-120111 | 9/1980 | (JP) . |
| 8-295225 | 11/1996 | (JP) . |
| 9-190916 | 7/1997 | (JP) . |

* cited by examiner

*Primary Examiner*—Robert L. Orberleitner
*Assistant Examiner*—Devon Kramer
(74) *Attorney, Agent, or Firm*—Foley & Lardner

(57) ABSTRACT

A solenoid-valve controller provided with a solenoid valve C which is switchable between the full closed state where a plunger a abuts on a sheet face b and the full open state where the plunger separates from the sheet face, and control means e for carrying out energization to a coil d for driving the plunger a of the solenoid valve C by pulse width modulation control, configured such that there are arranged regenerative-current formation means e for forming a regenerative current in parallel with the coil d, and the control means e are arranged with regenerative-current detection means g for detecting the regenerative current, and the control means e carry out pulse width modulation control based on a detection value of the regenerative-current detection means g.

This allows detection of the plunger position during actuation of the solenoid valve by a low-cost and small-sized technique requiring no enhancement of an attraction force of the coil of the solenoid valve.

22 Claims, 21 Drawing Sheets

FIG.4
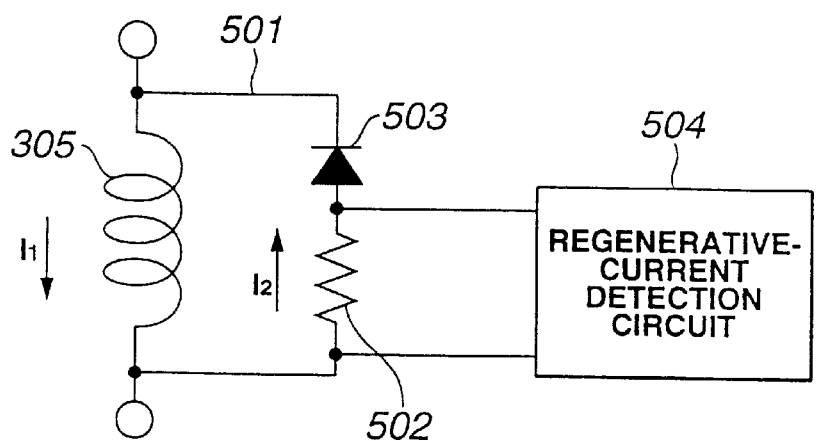
FIG.5 (a)
SOLENOID-VALVE APPLIED VOLTAGE
FIG.5 (b)
COIL CURRENT (I₁)
FIG.5 (c)
REGENERATIVE CURRENT (I₂)
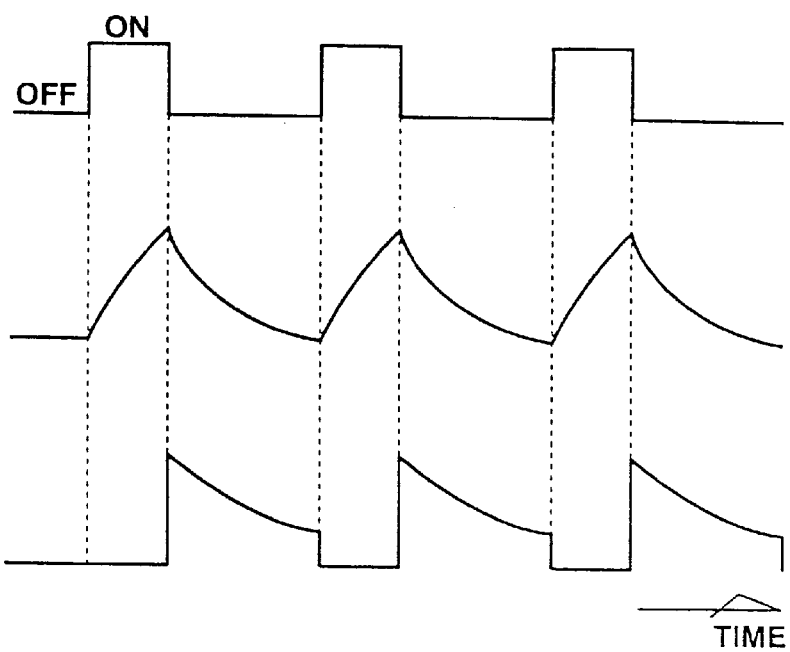

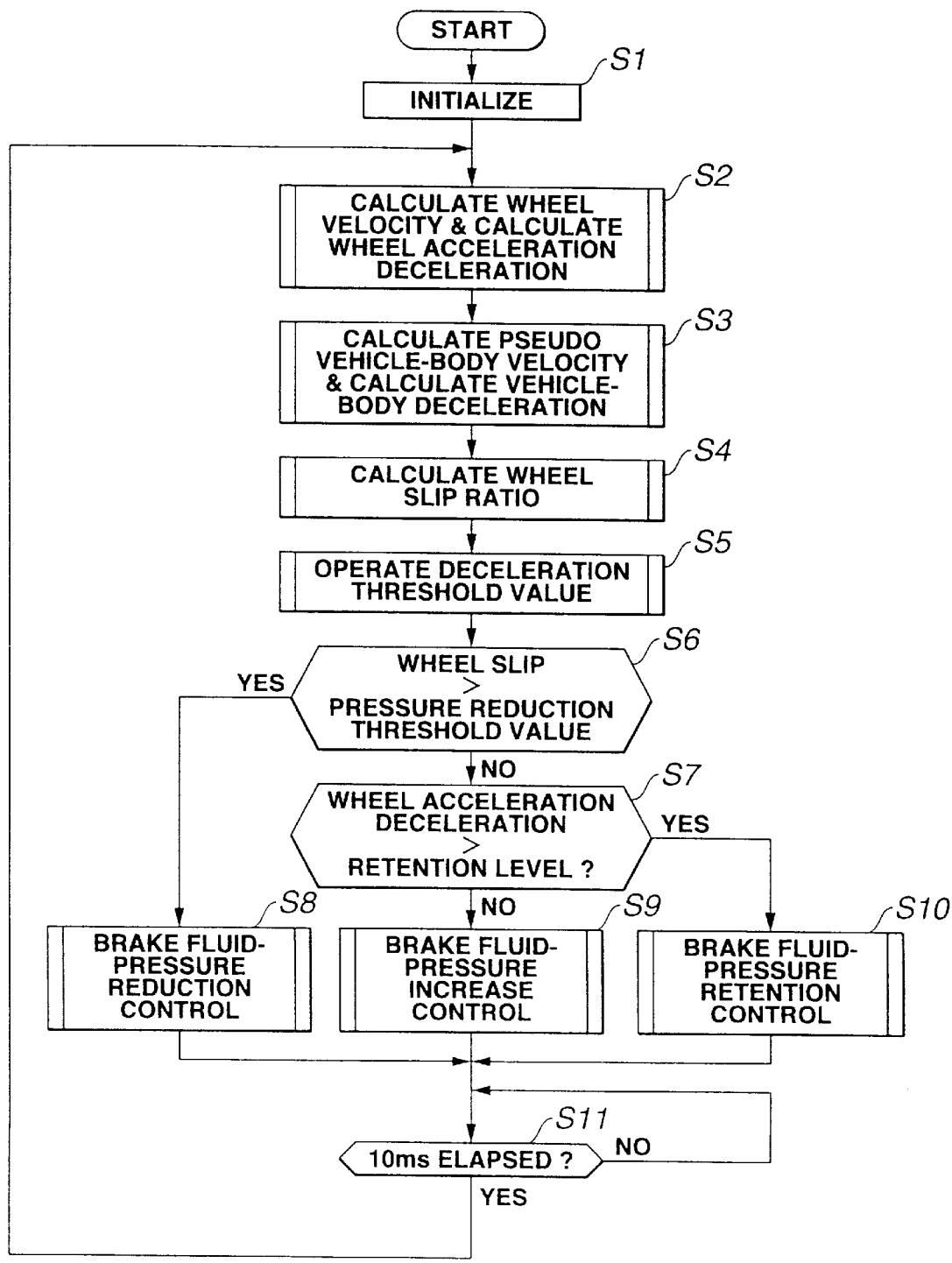

FIG.14 (a)
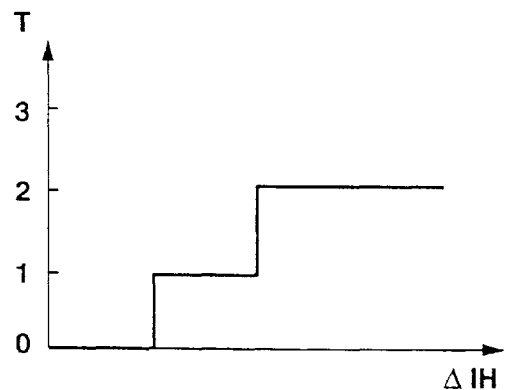
FIG.14 (b)
Kn-T CHARACTERISTIC
| Kn \ T | 0 | 1 |
|---|---|---|
| K1 | 0 | 0 |
| K2 | 1 | 0 |
| K3 | 1 | 1 |
FIG.15
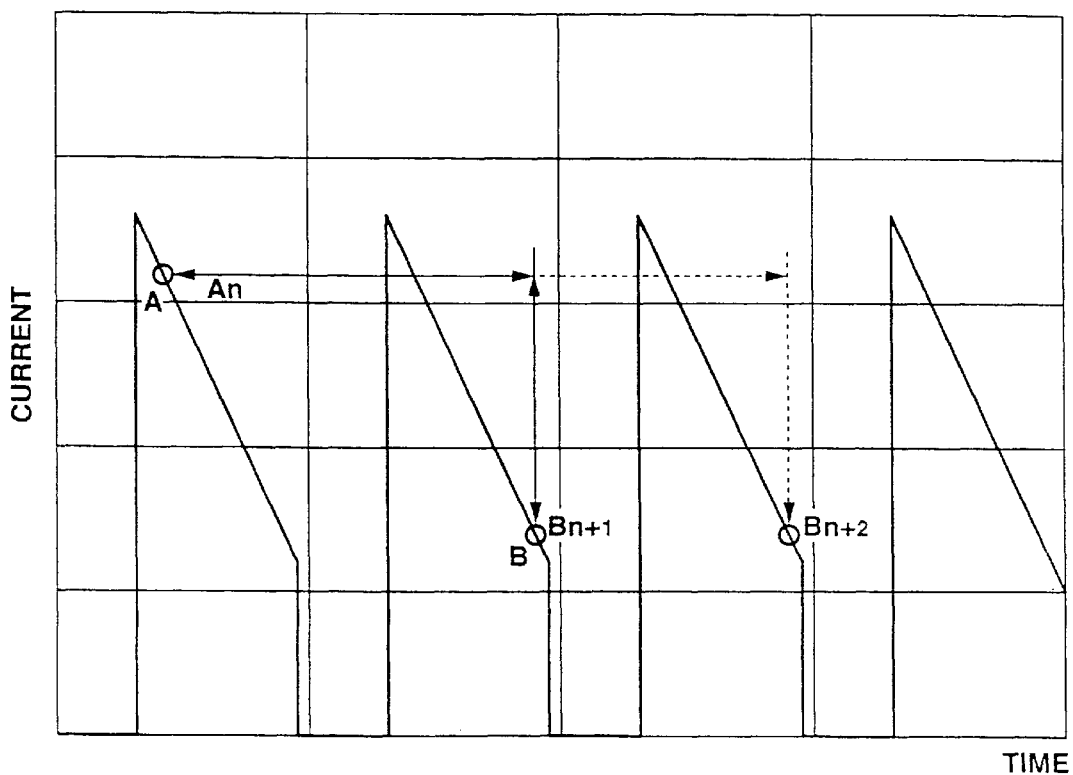

$$\text{SIGCNT} = \alpha(\text{PT} - \text{PL}) + \beta \cdot \text{PT}$$
$\alpha$ : FEEDBACK GAIN
$\beta$ : FEEDFORWARD GAIN

SOLENOID VALVE CONTROL APPARATUS AND BRAKE CONTROL APPARATUS

FIELD OF THE INVENTION

The present invention relates to brake controllers for carrying out ABS control for optimally controlling the brake-fluid pressure so as to prevent wheel lock during braking, moment control for producing, when a vehicle falls in excessive oversteer or excessive understeer during steering, a braking force in wheels so as to form a yaw moment in the direction of restraining it, traction control for producing, when a traction of driving wheels becomes excessively large, a braking force for restraining it, automatic braking control for producing a braking force during automatic cruising as required, brake-by-wire control wherein a brake pedal and wheel cylinders are not directly connected through a hydraulic transfer system, etc., and solenoid-valve controllers suitably applied to the brake controllers.

BACKGROUND ART

Conventionally, solenoid valves are used for increasing or decreasing the brakefluid pressure in ABS control, automatic braking control, etc. The solenoid valves are known in the form of a valve having a valve hole switched between full closing and full opening by a plunger and a valve having the opening degree of a valve hole proportionally controlled by controlling a plunger at a middle position between full closing and full opening. Due to the control reliability, size reduction, cost reduction, etc., of the apparatus, the bake controllers typically use the former solenoid valve.

One of the known methods of controlling the valve hole at the middle opening degree as ensured in the latter valve by using a solenoid valve with two switching positions of full opening and full closing relies upon the use of pulse-width modulation control (hereafter refer to as PWM control)(see, for example, a Japanese document of JP-A 8-295225).

However, brake controllers for carrying out the above PWM control do not provide means for determining whether or not a desired brake-fluid pressure is formed by locating the plunger of solenoid valve in a desired position. Feedback as to whether or not the solenoid valve carries out a desired operation is ensured in accordance with an actual wheel velocity, such as, for example, whether or not the wheel velocity rises or lowers to a target value after implementation of brake-fluid pressure control.

In such a way, when brake-fluid pressure control was carried out based on feedback on the wheel velocity, a time was absolutely needed until the result of operation of the solenoid valve is shown on the wheel velocity, resulting in a problem that a time was needed until the wheel velocity converges at a desired slip ratio.

Therefore, an improvement in the control responsibility is demanded to shorten a time up to convergence of the wheel velocity, and thus to obtain improved control quality.

In connection with one means for solving this problem, the inventors of the application guessed that the control responsibility could be improved by detecting in which position the plunger of the solenoid valve is controlled with respect to a desired position, which is then feedback controlled.

A prior art technique for checking the position of the plunger of such solenoid valve switching two positions of full opening and full closing is known from means disclosed in a Japanese document of JP-A 5-211105.

This prior art technique is configured such that a coil of the solenoid valve is connected in series with a current detection resistance, and is supplied with power during a short period of time to the extent that the plunger is hardly moved so as to take out a current response waveform at both ends of the current detection resistance, based on which the position of the plunger is determined.

However, this prior art technique is a technique for carrying out a check when the solenoid valve is not actuated. If such check takes place while actuating the solenoid valve, a value of current passing through the coil is reduced due to series arrangement of the current detection resistance and the coil of the solenoid valve, reducing an attraction force of the coil. Thus, for obtaining a desired coil attraction force, an increase in the number of turns of the coil of the solenoid valve is needed compared with the case with no current detection resistance arranged, resulting in a problem of an increase in manufacturing cost and in size of the solenoid valve.

The present invention is made in view of the above conventional problem, and has as a first objective to achieve detection of the position of the plunger during actuation of the solenoid valve by means of a low-cost and small sized technique which requires no enhancement of an attraction force of the coil of the solenoid valve.

Moreover, in the solving technique, a second objective is to enhance the detection accuracy, and a third objective is to enhance the control responsibility of the plunger of the solenoid valve. Additionally, a fourth objective is to improve the control responsibility of the brake controllers, and thus the control quality by apply the solving technique to brake controllers which can implement ABS control or automatic braking control by carrying out PWM control for the solenoid valve.

SUMMARY OF THE INVENTION

For achieving the above first objective, the invention as specified in claim 1 provides, as shown in a claim corresponding view in FIG. 1, a solenoid-valve controller provided with a solenoid valve C which is switchable between the full closed state where a plunger a abuts on a sheet face b and the full open state where the plunger separates from the sheet face, and control means e for carrying out energization to a coil d for driving the plunger a of the solenoid valve C by pulse width modulation control, characterized in that there are arranged regenerative-current formation means f for forming a regenerative current in parallel with said coil d, that said control means e are arranged with regenerative-current detection means g for detecting the regenerative current, and that said control means e carry out said pulse width modulation control based on a detection value of the regenerative-current detection means g.

It is noted that in the solenoid-valve controller depicted in claim 1, as specified in claim 2, said control means may be provided with an opening-degree determination part for determining a position of the plunger with respect to said sheet face based on a response waveform of the regenerative current.

The invention as depicted in claim 1 operates as follows:

When the control means e carry out energization based on pulse width modulation control to the coil d, the regenerative current is formed by the regenerative-current formation means arranged in parallel with the coil d after cutoff of energization. This regenerative current has a characteristic varying with an air-gap amount corresponding to a distance between the plunger a and the sheet face b, and therefore, a detection value of the regenerative-current formation means correspond to a position of the plunger a. The control means e carry out pulse width modulation control in accordance with the position of the plunger. And when detecting the position of the plunger a in such a way, the regenerative-current formation means f are arranged in parallel with the coil d, resulting in no lowering of an attraction force of the coil d.

Thus, the position of the plunger a can be detected without increasing the number of turns of the coil d, obtaining the effect of enabling detection of the position of the plunger a by means which are low in cost and require no increase in attraction force of the coil d.

Moreover, in the solenoid-valve controller depicted in claim 2, as specified in claim 3, said control means are provided with an output-value correction part for correcting an output value of the pulse width modulation control in accordance with the position of the plunger determined in the opening-degree determination part.

According to the invention as specified in claim 2, the inductance of the coil d varies in accordance with the position of the plunger a with respect to the sheet face b, in accordance with which a response waveform of the regenerative current varies. Therefore, based on the response waveform, the position of the plunger a can be determined easily.

Moreover, according to the invention as specified in claim 3, feedback control can be carried out in accordance with the position of the plunger a, enabling feedback control of higher responsibility than that of the output pressure by the solenoid valve C.

Further, for achieving the above second objective, the invention as specified in claim 4 is characterized in that in the solenoid-valve controller as specified in claim 2 or 3, when carrying out determination of the plunger position, said opening-degree determination part carries out determination based on a comparison between a regenerative-current characteristic corresponding to the response waveform of the regenerative current when the solenoid valve is in the full open state and the response waveform of the regenerative current when the solenoid valve is in the full closed state, and the response waveform of the detected regenerative current.

According to the invention as specified in claims 4 to 12, when carrying out determination of the plunger position, the opening-degree determination part compares the response waveform of the detected regenerative current and the regenerative-current characteristic corresponding to the response waveform of the regenerative current when the solenoid valve is in the full open state and the response waveform of the regenerative current when the solenoid valve is in the full closed state, and carries out determination based on the result of comparison.

In such a way, the opening degree (plunger position) is determined by a comparison between full opening and full closing, thus obtaining easy determination and high determination accuracy.

Moreover, as specified in claim 5, in the solenoid-valve controller depicted in claim 4, said opening-degree determination part may be such that the regenerative-current characteristic used in plunger-position determination is previously provided as a characteristic map of the regenerative current.

Moreover, as specified in claim 6, in the solenoid-valve controller depicted in claim 5, said opening-degree determination part may carry out characteristic-map correction for correcting said characteristic map of the regenerative current based on the response waveform of the regenerative current obtained when outputting a preset predetermined duty ratio in the state of no load resulting from the fluid pressure.

According to the invention as specified in claim 6, the opening-degree determination part carries out characteristic-map correction for correcting the characteristic map of the regenerative current. This correction is carried out in the state of no load resulting from the fluid pressure (state where no braking force is produced, for example, in a brake controller for a vehicle). In this case, first, a preset predetermined duty ratio is output to detect a response waveform of the regenerative current. Since the response waveform of the regenerative current produced when outputting this predetermined duty ratio can be estimated previously, the map illustrating the regenerative-current characteristic can be corrected based on a difference between the estimation value and the detection value.

In such a way, characteristic-map correction is carried out, so that even with the dispersion of the characteristic of the solenoid valves due to assembling error thereof, this can be corrected to detect the opening degree (plunger position) with high accuracy.

Moreover, as specified in claim 7, in the solenoid-valve controller depicted in claim 6, said opening-degree determination part may carry out characteristic-map correction when detecting start of the apparatus.

Moreover, as specified in claim 8, in the solenoid-valve controller as specified in claim 7, said opening-degree determination part may carry out characteristic-map correction when inputting a predetermined signal upon shipment in addition to upon start of the apparatus.

According to the invention as specified in claim 7, characteristic-map correction is carried out every start of the apparatus, for example, every start of the vehicle for the brake controller. Moreover, in the invention as specified in claim 8, characteristic-map correction is carried out upon factory shipment in addition to upon start of the apparatus.

Therefore, according to the invention as specified in claims 7 and 8, even if the characteristic varies due to occurrence of deterioration of the solenoid valve with time such as wear of the plunger and the sheet face, accurate countermeasure is always possible to obtain high detection accuracy of the opening degree (plunger position). Further, according to the invention as specified in claim 8, even with the dispersion of the characteristic of the solenoid valves due to assembling error and the like, this can be corrected upon shipment, obtaining high detection accuracy.

Moreover, for achieving the above second objective, the invention as specified in claim 9 is characterized in that in the solenoid-valve controller depicted in claims 5 to 8, said characteristic map of the regenerative current is a map illustrating a gradient value from rise to fall of the regenerative current when the solenoid valve is in the full open state and a gradient value from rise to fall of the regenerative current when the solenoid valve is in the full closed state, and said opening-degree determination part obtains the gradient value from rise to fall of the regenerative current out of the response waveform of the regenerative current as detected, and determines the position of the plunger based on this gradient value and said characteristic map of the regenerative current.

According to the invention as specified in claim 9, when obtaining the opening degree (plunger position), the opening-degree determination part obtains a gradient value from rise to fall of the regenerative current in the response waveform of the regenerative current, and compares this gradient value and gradient values in the full open state and in the full closed state in the characteristic map of regenerative current to obtain the opening degree (plunger position) based on a relative comparison of those gradient values.

In such a way, at a certain point in the response waveform of the regenerative current, detection is not carried out with regard to a current value, but the gradient of the waveform, so that the dispersion of current values at the respective points can be absorbed, achieving an improvement in the detection accuracy.

Moreover, as specified in claim 10, in the solenoid-valve controller depicted in claim 9, when obtaining the gradient value of the regenerative current, said opening-degree determination part may carry out averaging correction wherein a value obtained by averaging processing of the gradient values corresponding to a plurality of response waveforms detected in a single control cycle is set to the gradient value.

According to the invention as specified in claim 10, the opening-degree determination part operates as follows: In PWM control, a plurality of ON signals is output in a single control cycle. The opening-degree determination part obtains a plurality of gradient values of regenerative-current waveforms responsive to the ON signals, which are averaged to obtain an averaged gradient value which is set to the gradient value of the regenerative current in the control cycle.

Therefore, even if the dispersion is produced in a plurality of regenerative-current waveforms due to superimposition of noise, etc., averaging can remove an influence of the dispersion, achieving an improvement in the detection accuracy.

Moreover, as specified in claim 11, in the solenoid-valve controller depicted in claim 10, when carrying out averaging correction, said opening-degree determination part may carry out averaging processing with weighting of the gradient value obtained from the late response waveforms in the single control cycle being heavier than that of the gradient value obtained from the initial response waveforms.

According to the invention as specified in claim 11, the opening-degree determination part operates as follows: When the duty cycle is varied between the last control cycle and this control cycle, a time is needed for movement of the plunger in response to this variation. Therefore, in the response waveform of the regenerative current, also, the response waveform of the regenerative current produced during movement of the plunger has high possibility to correspond to the moving position thereof. On the other hand, the response waveform of the regenerative current produced at the late stage of a single control cycle has high possibility to correspond to the actual plunger position corresponding to the output duty ratio. Then, in the same way as the invention as specified in claim 10, when carrying out averaging processing of gradient values, weighting of the gradient value obtained from the late ones of the plurality of response waveforms of the regenerative current produced in a single control cycle are set to be heavier than that of the gradient value obtained from the initial response waveforms having high possibility to correspond to the moving position so as to carry out averaging processing.

In such a way, by increasing weighting of the gradient value having high possibility to correspond to the plunger position in response to the output duty ratio and decreasing weighting of the gradient value having high possibility to correspond to the moving position, the detection accuracy of the opening degree (plunger position) is enhanced further.

Moreover, as specified in claim 12, in the solenoid-valve controller depicted in claims 9 to 11, said opening-degree determination part may calculate the gradient value based on a detection value in the response waveform of the regenerative current across a plurality of periods in the single control cycle.

According to the invention as specified in claim 12, when obtaining a gradient value from a plurality of response waveforms of the regenerative current produced in the single control cycle, the gradient value is calculated across the plurality of response waveforms. Specifically, the gradient value, which indicates an inclination from a rise value to a fall value in the response waveform of the regenerative current, can be obtained from values at at least two points of the inclined waveform and a time therebetween. However, assuming that the plurality of response waveforms are all common, the values at the two points may not always be obtained from one response waveform, but can be obtained from response waveforms of different cycles. By way of example, even with a rise value of the inclined waveform obtained from the nth response waveform of the regenerative current, and a fall value of the inclined waveform obtained from the (n+1)th, (n+2)th or (n+3)th value, the condition that a time therebetween is a value corresponding to one response waveform of the regenerative current can provide a gradient value of one response waveform of the regenerative current.

And in such a case, operation for obtaining the gradient value is not needed to take place every occurrence of the response waveform, enabling a reduction in the number of operations.

Therefore, the processing speed of the arithmetic unit can be limited, enabling operation with low-cost arithmetic means. Particularly, when carrying out PWM control, enhancement of the output frequency is demanded to restrain occurrence of the pulse pressure due to the solenoid valve and abnormal noise called "cry" at the coil of the solenoid valve. However, in this case, response waveforms of the regenerative current are produced at high frequency, so that operation of a gradient value for each response waveform needs a high-speed arithmetic processing unit. On the other hand, according to the present invention, operation is carried out across a plurality of response waveforms of the regenerative current, so that a gradient value can be obtained without high-speed arithmetic processing.

Moreover, as specified in claim 13, in the solenoid-valve controller depicted in claims 2 to 12, said control means may be arranged with voltage detection means for detecting a battery voltage and temperature detection means for obtaining a coil temperature of the solenoid valve, and said opening-degree determination part may carry out gradient-value correction for correcting the calculated gradient value based on the detected battery voltage and coil temperature.

The invention as specified in claim 13 operates as follows: When actuating the solenoid valve, the coil temperature rises, in accordance with which the coil resistance increases to lower a current value of the regenerative current. Therefore, the response waveform of the regenerative current and the valve opening degree (plunger position) do not correspond to each other. Likewise, when the battery voltage varies, a current value of the regenerative current varies, so that the response waveform of the regenerative current and the valve opening degree (plunger position) do not correspond to each other.

Then, according to the present invention, the voltage detection means detect the battery voltage, and the temperature detection means detect the coil temperature. Based on the battery voltage and coil temperature as detected, gradient-value correction is carried out to correct a gradient value as calculated.

Therefore, a certain relationship of correspondence can always be preserved between the response waveform of the regenerative current and the plunger position, allowing accurate detection of the opening degree (plunger position).

Moreover, for achieving the above third objective, the invention as specified in claim 14 is characterized in that in the solenoid-valve controller depicted in claims 3 to 13, said output-value correction part calculates an operating point at which the plunger starts to operate by applying a predetermined current to the coil, and determines the output characteristic in accordance with the operating point.

The invention as specified in claim 14 operates as follows:

The solenoid valve may have some dispersion in performance due to assembling error and parts manufacturing error such as resilient force of a return spring. As a result, the dispersion may occur with regard to the operating point at which the plunger starts to move when energizing the solenoid valve.

Then, according to the present invention, the output-value correction part applies a predetermined current to the coil to calculate the operating point, in accordance with which the output characteristic is determined. Therefore, even if the operating points are dispersed due to the solenoid valves as described above, correction is possible to operate all the valves with the common characteristic. Thus, the control accuracy can be enhanced to achieve an improvement in the control quality.

Moreover, for achieving the above third objective, the invention as specified in claims 3 to 14 is characterized in that in the solenoid-valve controller as specified in claims 3 to 14, when altering the duty ratio of the output signal output from said control means, said output-value correction part carries out correction upon alteration start for adding a correction value to a target duty ratio during a predetermined period of time from start of output of a new duty ratio.

Moreover, in the solenoid-valve controller depicted in claim 15, as specified in claim 16, said output-value correction part may determine whether or not correction upon alteration start is carried out in accordance with an amount of deviation between this duty ratio and the last duty ratio, and if the amount of deviation is greater than a predetermined value, it may determine to carry out correction upon alteration start.

The invention as specified in claim 15 operates as follows: The control means output a signal of the same duty ratio during a single control cycle. When locating the plunger in the position corresponding to the duty ratio, a desired valve opening degree is obtained. Thereafter, if the output duty ratio is altered in accordance with passage from this control cycle to the next control cycle, the plunger will move to the position corresponding to the next duty ratio. In this case, a time is needed for the plunger to move actually to a desired position. A time is also needed for the response waveform of the regenerative current to be a waveform corresponding to the plunger position.

Then, according to the present invention, when the control means change the duty ratio, the output-value alteration means carry out correction upon alteration start to add a correction value to a target duty ratio during a predetermined period of time from alteration of the duty ratio.

Therefore, the initial responsibility of the plunger is enhanced, so that the plunger reaches the target position in a shorter time than ever, and the response waveform of the regenerative current stabilizes a waveform corresponding to the plunger position. Thus, an improvement can be achieved in the control responsibility and in the control accuracy.

Moreover, as described above, when the duty ratio is changed, the greater an amount of deviation between the last duty ratio and this duty ratio, the greater a response lag is. Therefore, according to the invention as specified in claim 16, it is determined whether or not correction upon alteration start is carried out in response to this amount of deviation.

Thus, according to the invention as specified in claim 16, when having high possibility to produce a response lag, correction upon alteration start is carried out accurately to enable achievement of higher control quality.

Moreover, for achieving the above first objective, the invention as specified in claim 17 is characterized in that in the solenoid-valve controller depicted in claims 1 to 16, said regenerative-current formation means comprise a current detection resistance connected in parallel with the coil of said solenoid valve, and back-flow prevention means arranged in series with the current detection resistance and for inhibiting energization of the current detection resistance in the direction of current passage for driving the coil, and allowing merely energization of the regenerative current in the opposite direction.

Moreover, in the solenoid-valve controller depicted in claim 17, as specified in claim 18, said back-flow prevention means may be in the form of a diode.

The invention as specified in claim 17 can form a regenerative current in a simple and low-cost structure.

Moreover, according to the invention as specified in claim 18, the back-flow prevention means are in the form of a diode, enabling achievement of the back-flow prevention means by a simple and low-cost structure.

Moreover, for achieving the above fourth objective, the invention as specified in claim 19 provides a brake controller to which the solenoid-valve controller as depicted in claims 1 to 18 is applied, characterized in that said solenoid valve is a valve for adjusting the brake-fluid pressure within each wheel of a vehicle, and that said control means are applied to brake control means for outputting to said solenoid valve a signal for bringing the brake-fluid pressure to a desired pressure based on a signal out of cruising-condition detection means for detecting a cruising condition of the vehicle, the signal for adjusting the brakefluid pressure being output to the solenoid valve by said pulse width modulation control.

It is noted that as specified in claim 20, in the brake controller depicted in claim 19, the structure may be characterized in that it further includes target fluid-pressure calculation means for calculating a target fluid pressure of said brake-fluid pressure and a target fluid-pressure gradient which is a rate of change of a target fluid pressure per unit of time based on the cruising condition detected by said cruising-condition detection means, that said solenoid valves are arranged with a main passage which can supply to a wheel cylinder the brake-fluid pressure produced by a control fluid-pressure source independent of a brake operation fluid-pressure source for producing the brake-fluid pressure in accordance with driver's brake operation and driver's brake operation itself, and a return passage for returning brake fluid supplied to said wheel cylinder to said brake operation fluid-pressure source through a reservoir, and that when said control means increase the wheel-cylinder pressure from the preserved state, said output-value correction part carries out rise correction wherein a gain is multiplied to temporally enhance the output duty ratio with respect to a value corresponding to the target fluid-pressure gradient in the initial stage of pressure increase.

Moreover, as specified in claim 21, in the brake controller depicted in claim 20, upon implementation of rise correction, said output-value correction part may gradually enhance a gain by which the output duty ratio is multiplied at the initial stage in accordance with a lapse of time, and then gradually lower it.

Moreover, as specified in claim 22, in the brake controller depicted in claim 21, after implementation of rise correction, output-value correction part may carry out correction for temporally reducing the output duty ratio with respect to the target fluid-pressure gradient.

According to the invention as specified in claims 19 to 22, in the brake controller which can carry out ABS control or automatic brake control, when carrying out control of the brake-fluid pressure, feedback control is possible in accordance with the plunger position compared with conventional feedback of the control condition in accordance with a change in the wheel velocity, enabling an improvement in the control responsibility of the brake controller, and thus in the control quality.

The invention as specified in claim 20 operates as follows:

In the brake controller which can carry out ABS control or automatic brake control, when increasing the wheel-cylinder pressure from the preserved state, a response lag of an actual fluid-pressure gradient with respect to the target fluid-pressure gradient occurs in the initial stage of pressure increase due to a response lag of the solenoid valve and the fluid pressure. And thereafter, overshoot occurs wherein the actual fluid-pressure gradient temporally exceeds the target fluid-pressure gradient.

On the other hand, according to the present invention, the control means carry out rise correction wherein a gain is multiplied to temporally enhance the output duty ratio with respect to a value corresponding to the target fluid-pressure gradient. This results in transition of the target fluid pressure with the gradient higher than the gradient for normal transition thereof, enabling an elimination of the above response lag, and thus an improvement in the control quality.

Further, according to the invention as specified in claim 21, upon implementation of the above rise correction, a gain by which the output duty ratio is multiplied is gradually enhanced at the initial stage, and then lowered. By changing the gain in such a way, an amount of subsequent overshoot can be restrained low while preventing a response lag.

Moreover, according to the invention as specified in claim 22, after implementation of rise correction, correction part is carried out for temporally reducing the output duty ratio with respect to the target fluid-pressure gradient. This enables a restraint of overshoot to conform the actual fluid-pressure gradient to the target fluid-pressure gradient, obtaining high control quality.

BRIEF DESCRIPTION OF THE DRAWINGS

FIG. 4 is an explanatory of a major part in the embodiments.

FIGS. 5(a)–5(c) are characteristic views of applied voltage, coil current, and regenerative current.

FIG. 7 is a flow chart showing flow of ABS control in the embodiments.

FIGS. 14(a)–14(b) are characteristic views of weighting in the embodiment 4.

FIG. 15 is an explanatory view of the embodiment 5.

BEST MODE FOR CARRYING OUT THE INVENTION

Embodiments of this invention will be described in detail hereafter based on the drawings.

For describing the embodiments, a structure wherein the invention is applied to an ABS controller for preventing wheel lock during braking will be given as an example. The ABS controller is typically configured to compare a wheel velocity with a pseudo vehicle-body velocity (value of a vehicle velocity obtained approximately by operation) to determine the magnitude of the slip ratio of each wheel.

When the slip ratio is greater than a certain value, ABS control is started to reduce, retain or increase the fluid pressure applied to a wheel cylinder of each wheel, preventing wheel lock.

Figure 1:
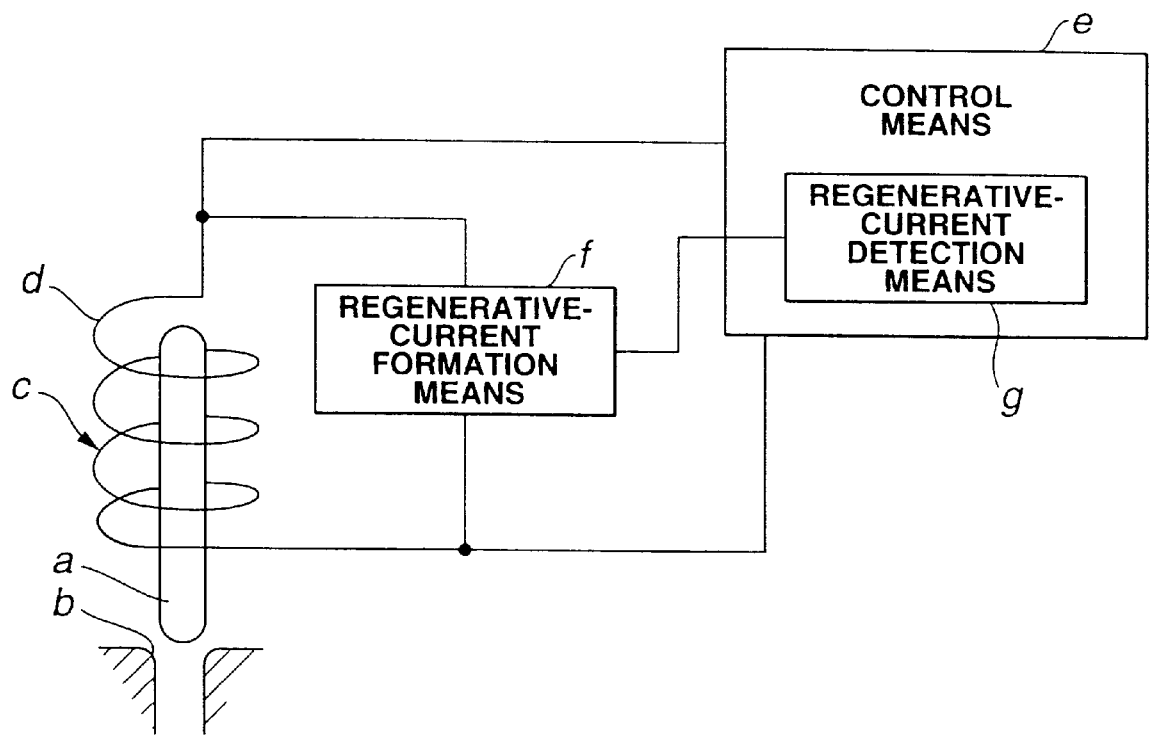
FIG. 1 is a claim corresponding view, showing a solenoid-valve controller of the present invention.
Figure 2:
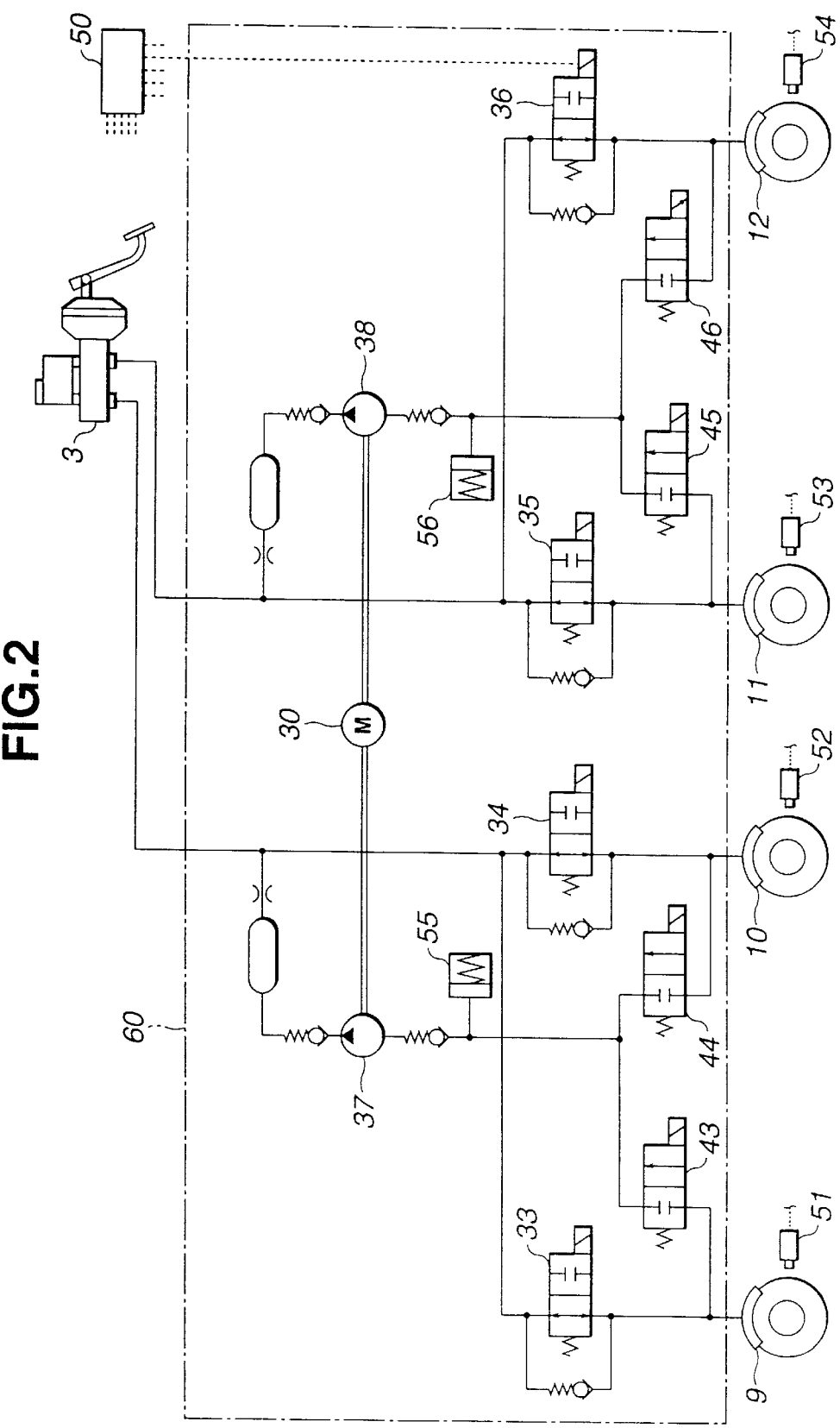
FIG. 2 is a diagram of a hydraulic circuit for a brake controller in embodiments.

FIG. 2 shows a hydraulic circuit for a brake-fluid pressure controller in the embodiments. A brake unit 60 is arranged in the middle of a coupled circuit of a master cylinder and the wheel cylinders 9, 10, 11, 12. Arranged in the brake unit 60 in the respective illustrated positions are normally-open pressure-increase side solenoid valves 33, 34, 35, 36 and normally-closed pressure-reduction side solenoid valves 43, 44, 45, 46, which carry out pressure reduction, retention and increase of the wheel cylinders 9–12. Moreover, arranged in the brake unit 60 are pumps 37, 38 for returning to the master cylinder 3 oil removed from the wheel cylinders 9–12 to reservoirs 55, 56 during pressure reduction. During pressure reduction of the wheel cylinders 9–12, the pressure-increase side solenoid valves 33–36 are closed, and the pressure-reduction side solenoid valves 43–46 are open/closed, removing brake fluid of the wheel cylinders 9–12 to the reservoirs 55, 56. During pressure retention, the solenoid valves 33–36, 43–46 are closed to enclose brake fluid in the wheel cylinders 9–12. During pressure increase, the pressure-increase side solenoid valves 33–36 are open, and the pressure-reduction side solenoid valves 43–46 are closed as shown in the drawing. Moreover, the pumps 37, 38 are driven by a motor 30.

Further, wheel-velocity sensors 51, 52, 53, 54 are arranged to generate wheel-velocity pulses of wheels (not shown). The wheel-velocity sensors 51–54 are connected to a control unit 50. It is noted that signal lines with the control unit 50 are partly omitted in the drawings.

Said control unit 50 carries out PWM control with respect to the pressure-increase side solenoid valves 33–36. This PWM control is carried out during ON→OFF→ON, and is composed of a full OFF time and a time during which an ON signal based on the duty ratio is operated.

Figure 3:
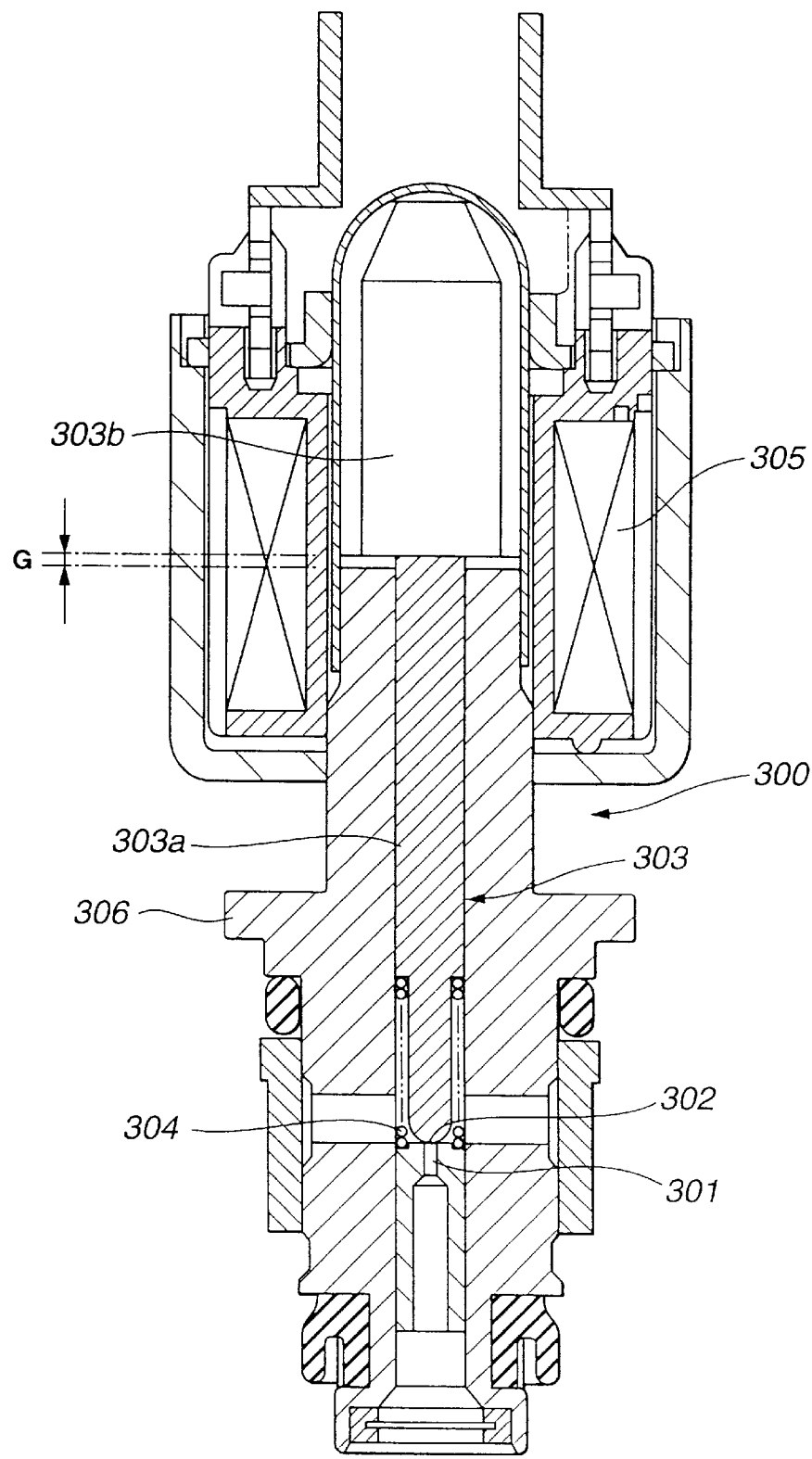
FIG. 3 is a sectional view of a solenoid valve in the embodiments.

Next, FIG. 3 shows an ON/OFF type solenoid valve 300 applied to said pressure-increase side solenoid valves 33–36. This solenoid valve 300 is provided with a valve hole 301, a sheet face 302 arranged around the valve hole 301, a plunger 303 for ensuring operation to open and close the valve hole 301, a spring 304 for biasing the plunger 303 in the valve opening direction, and a coil 305 for attracting the plunger 303 by excitation resulting from energization. Moreover, the plunger 303 is provided with a valve portion 303a abutting on the sheet face 302, and a movable iron-core portion 303b receiving an attraction force from the coil 305. And an air gap G is arranged between the movable iron core portion 303b and a valve body 306.

Next, the featured structure of this embodiment will be described in accordance with FIG. 4.

Connected in parallel with the coil 305 of the solenoid valve 300 constituting said pressure-increase side solenoid valve is a regenerative-current formation circuit 501 to which a current detection resistance 502 and a diode 503 are connected in series. The diode 503 is arranged so that current to the coil 305 in the direction of energization does not pass through the current detection resistance 502.

Connected upstream and downstream of said current detection resistance 502 is a regenerative-current detection circuit 504 which is arranged in the control unit 50.

Specifically, when a drive current I1 is provided to the coil 305 of the solenoid valve 300 (this is energization for exciting the coil 305, and passes through as illustrated in the drawing), and when the energization is cut off, a regenerative current I2 in the opposite direction to the drive current passes through the regenerative-current formation circuit 501, which is detected by the regenerative-current detection circuit 504.

FIG. 5 shows the relationship between these signals, wherein (a) denotes an output signal of the control unit 50, (b) denotes the drive current I1 passing through the coil 305, and (c) denotes the regenerative current I2. As illustrated in the drawing, the drive current I1 passes through the coil 305, having a current value increased in accordance with output of an ON signal when an output signal is output from the control unit 305 (ON part corresponds to a duty signal), and a current value decreased when the output signal is switched from ON to OFF. On the other hand, the regenerative current I2 passes in the opposite direction to the drive current I1 when the output signal is switched from ON to OFF, a current value of which is high at the moment at which switching is made from ON to OFF, and then varies to lower gradually. It is noted that a current value of the drive current I1 is determined by the duty ratio of ON part of the output signal, and is increased as the duty ratio is increased, and deceased as the duty ratio is decreased.

The regenerative current I2 has different waveforms in accordance with an inductance characteristic varying with a clearance of said air gap G. Specifically, as shown in FIG. 6(b), an inductance L varies with the magnitude of the dimension of the air gap G. And as shown in FIG. 6(a), a value of the regenerative current I2 varies with a variation in the dimension (ΔI in the drawing). Therefore, the dimension of the air gap G, i.e. the position of the plunger 303 can be detected out of a value of the regenerative current I2 in the regenerative-current detection circuit.

Next, ABS control in the control unit 50 will be described.

FIG. 7 is a flow chart showing fundamental flow of ABS control. At a step S1, an initialization is carried out. At a subsequent step S2, the wheel velocity is operated based on signals out of the wheel-velocity sensors 51–54, and the wheel acceleration and deceleration is calculated out of its rate of change.

At a step S3, the pseudo vehicle-body velocity is calculated based on the wheel velocity, and the vehicle deceleration is obtained based thereon. Further, at a step S4, the slip ratio of the wheels is calculated. At a subsequent step S5, a pressure-reduction threshold value is operated.

Next, at a step S6, it is determined whether or not the slip ratio obtained out of the wheel velocity exceeds the pressure-reduction threshold value. When exceeding it (YES), flow proceeds to a step S8 where pressure-reduction control of the brake-fluid pressure is carried out. On the other hand, if the slip ratio is smaller than the pressure-reduction threshold value (NO), flow proceeds to a step S7 where it is determined whether or not the wheel acceleration and deceleration is greater than a predetermined retention level. When being greater than it (YES), flow proceeds to a step S10 where pressure-retention control of the brake-fluid pressure is carried out. When the wheel acceleration and deceleration is smaller than the retention level, pressure-increase control of the brake-fluid pressure is carried out. And this ABS control is carried out every 10 ms. At a step S11, it is determined whether or not 10 ms elapsed. After a lapse of 10 ms, flow proceeds to a step S2.

In this embodiment, in connection with implementation of PWM control, for example, PWM control is started with pressure retention control of the brake-fluid pressure at the step S10, and output of a duty-ratio signal is carried out based on PWM control with pressure-increase control of the brake-fluid pressure at the step S9. When implementing this PWM control, feedback control is carried out to alter detection of the position of the movable iron-core portion 303b of the plunger 303 and an output current value.

Next, the respective embodiments will be described in detail.

Embodiment 1

The embodiment 1 corresponds to the invention depicted in claims 1–3 and 17–19, and relates to feedback control for altering detection of the position (of the movable iron-core portion 303b) of the above plunger 303 and an output current value. Feedback control in this embodiment 1 will be described in detail in accordance with the flow chart in FIG. 8.

Figure 6:
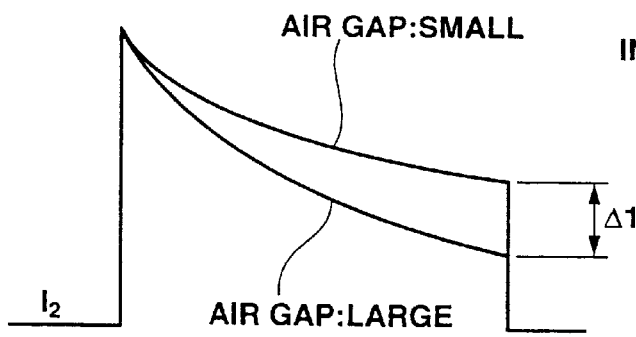
FIGS. 6(a)–6(b) are characteristic views illustrating the relationship between regenerative current and an air gap.
Figure 6:
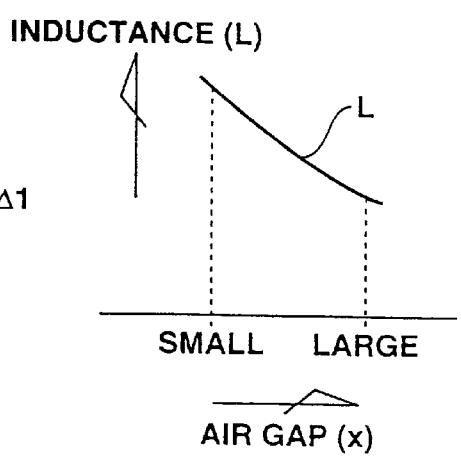

First, at a step S21, the regenerative current I2 is detected in the regenerative-current detection circuit 504. At a step S22, a regenerative-current waveform as shown in FIG. 6 is read to detect the position (of the movable iron-core portion 303b) of the plunger 303 based on the difference ΔI resulting from the air gap G.

At a subsequent step S23, it is determined whether or not the detected position of the plunger 303 is a target position. If it is the target position, flow returns without any processing. On the other hand, if the detected position is shifted from the target position, flow proceeds to a step S24 where the drive current Iis corrected. This correction is carried out by alteration of the duty ratio.

In the embodiment as described above, the position of the plunger 303 of the solenoid valve 300 can be detected accurately. And at this time, due to parallel arrangement of the current-detection resistance 502 with respect to the coil 305 of the solenoid valve 305, and no energization of the current detection resistance 502 during energization of the coil 305 by means of the diode 503, an attraction force of the coil 305 may not be lowered.

Therefore, there is no need to increase the number of turns of the coil 305 of the solenoid valve 300, enabling accurate detection of the position of the plunger 303 while driving the solenoid valve 300 without any cost increase nor size enlargement of the solenoid valve, resulting in the solution of the conventional problem.

And as described above, due to possible detection of the position of the plunger 303 of the solenoid valve 300, with pressure-increase control of the brake-fluid pressure, the output fluid pressure of the solenoid valve 300 is not feedback controlled in accordance with a variation in the wheel velocity based on actual pressure increase, but can be feedback controlled in accordance with the position of plunger 303, obtaining the effect of possible improvement in the control responsibility, and thus in the control quality. In addition, such feedback control is carried out by a simple structure without a pressure sensor for detecting the wheel-cylinder pressure or the like, but with the regenerative-current formation circuit 501 and the regenerative-current detection circuit 504 incorporated in the circuit, resulting in possible achievement of the above effect at low cost.

Embodiment 2

Figure 8:
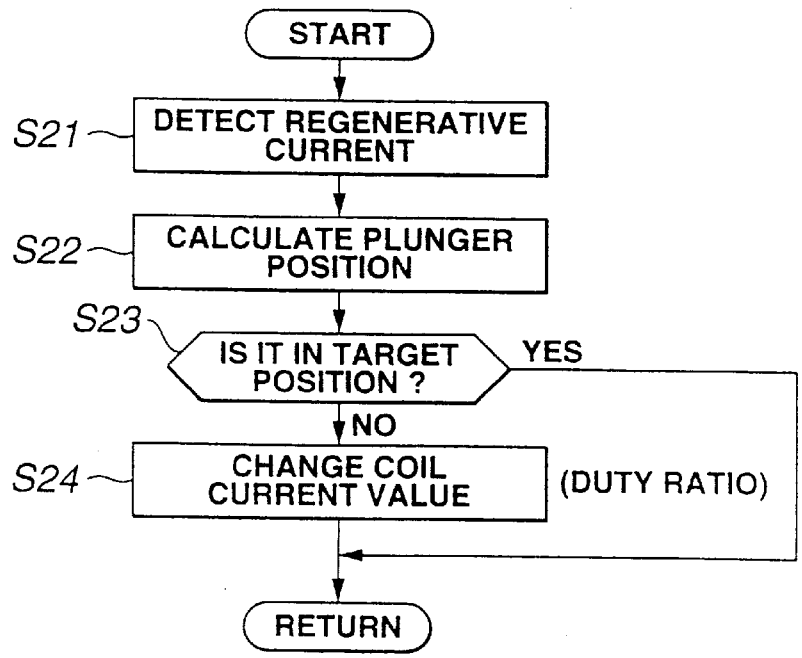
FIG. 8 is a flow chart showing flow of plunger-position detection and feedback control in the embodiment 1.

The embodiment 2 corresponds to the invention depicted in claims 4, 5 and 9, and differs from the embodiment 1 in the method of calculating the plunger position, which is shown in the description of the embodiment 1 in connection with the step S22 in FIG. 8.

Figure 9:
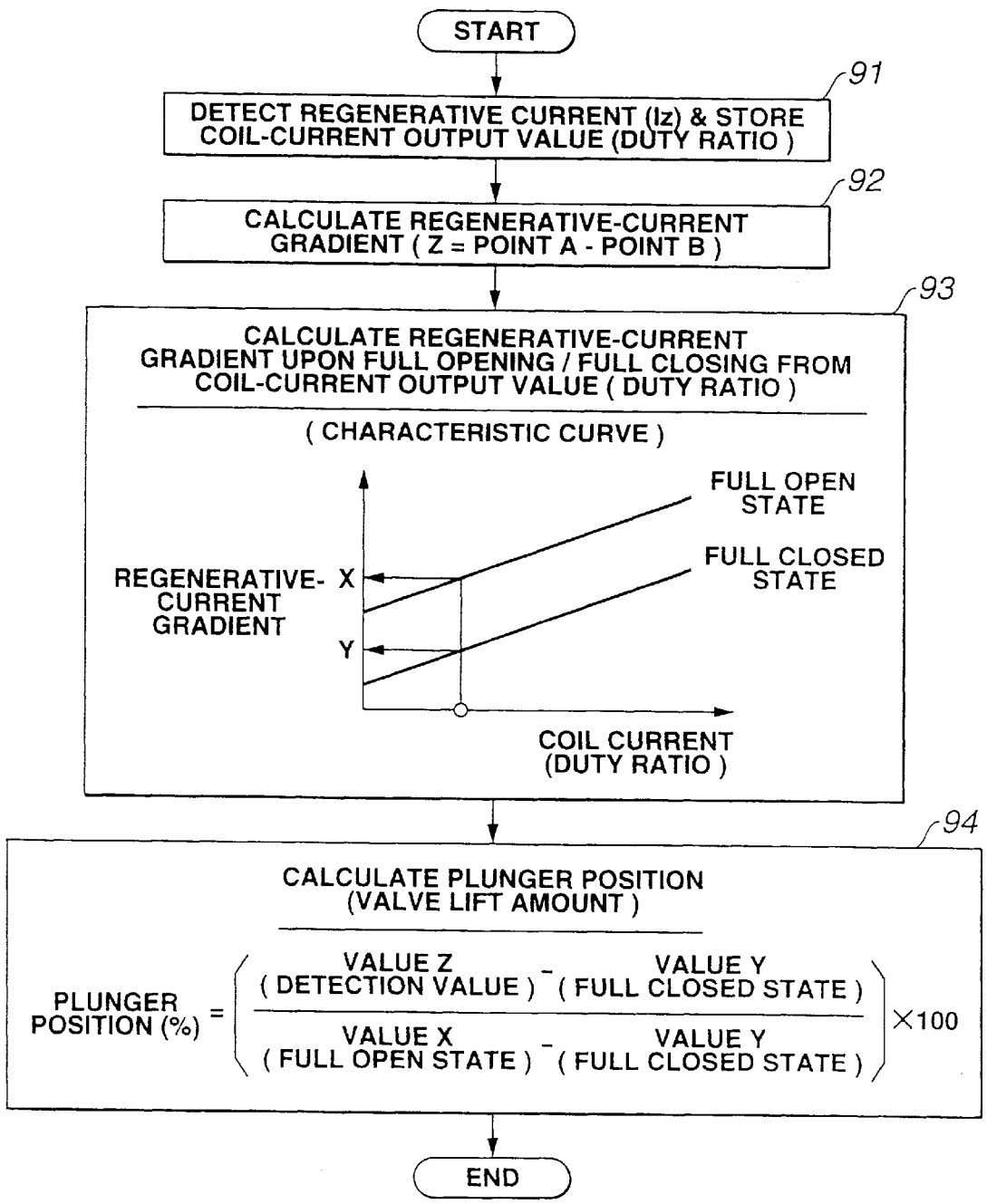
FIG. 9 is a flow chart showing flow of plunger-position calculation in the embodiment 2.

This will be described according to the flow chart in FIG. 9.

First, at a step 91, the regenerative current I2 is detected, and the output duty ratio is stored.

Figure 10:
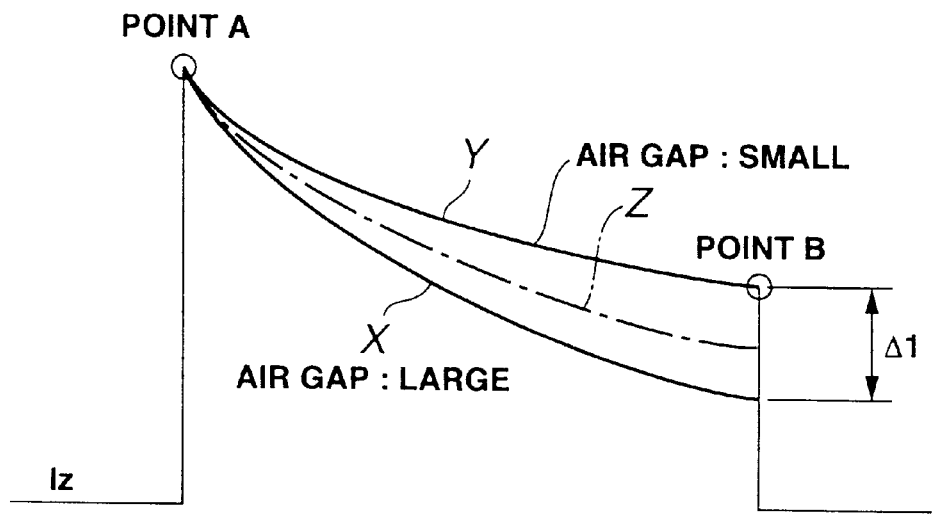
FIG. 10 is a drawing illustrating a characteristic map of regenerative current in the embodiment 2.

Next, at a step 92, a gradient value Z of the regenerative current is calculated. Specifically, this gradient value Z is an approximation of the gradient of a waveform of the regenerative current obtained from the inclination of a line connecting a point A and a point B as shown in FIG. 10.

Next, at a step 93, based on a characteristic map of regenerative current as previously input, a gradient value X upon full opening and a gradient value Y upon full closing are obtained at the stored duty ratio. Specifically, the gradient value X upon full opening and the gradient value Y upon full closing for the regenerative current as shown in FIG. 10 are input as a characteristic map of regenerative current for every duty ratio, which are obtained at the step 93.

Next, at a step 94, the position of the plunger is calculated by $\{(Z-Y)/(X-Y)\} * 100$. Specifically, the position is obtained based on what is the ratio of the actual gradient value Z to the two gradient values X, Y.

In such a way, in the embodiment 2, since the position of the plunger 303 is obtained from the gradient value Z of a response waveform of the regenerative current, an influence of dispersed detection is restrained with respect to the embodiment 1 wherein the position is obtained from the difference ΔI at fall of the regenerative current, enabling improved accuracy.

In addition, since the gradient value Y upon full opening and the gradient value Y upon full closing are previously stored as a map for every duty ratio, the processing speed is higher, obtaining excellent detection responsibility.

In this connection, in the embodiment 2, the plunger position is obtained based on a gradient value of a response waveform of the regenerative current and a map of gradient values upon full opening and full closing. However, such detection based on a map and a response waveform (application of the invention as depicted in claims 4 and 5, in short) is not limited to the method based on a gradient value, and is also applicable to the method based on the current difference ΔI as in the embodiment 1. That is, the plunger position can be detected such that the current difference ΔI between full opening and full closing is previously stored as a characteristic map of regenerative current, and it is determined what is a value of ratio of a current value detected from this response waveform to the current difference ΔI.

Embodiment 3

The embodiment 3 corresponds to the invention as depicted in claims 4 to 9, and is an example that the characteristic map of regenerative current as illustrated at the step 93 in the embodiment 2 is corrected for each solenoid valve 300.

Figure 11:
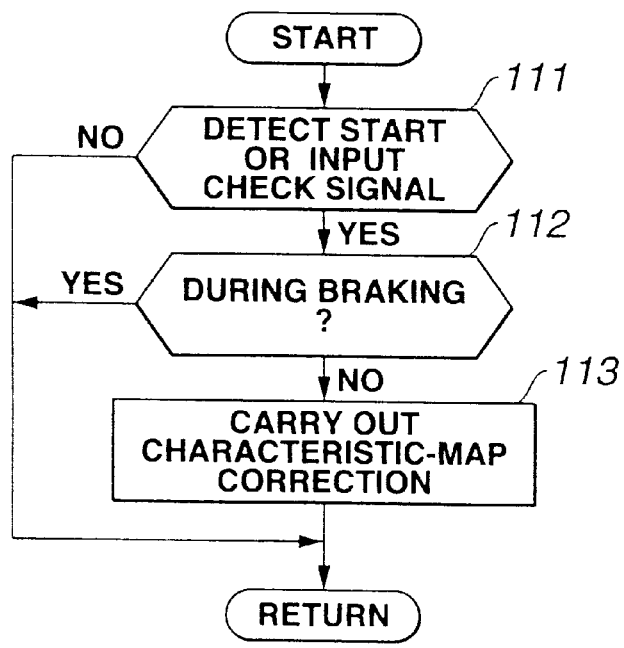
FIG. 11 is a flow chart showing control flow of correction of the characteristic map in the embodiment 3.

Flow of this map correction will be described according to the flow chart in FIG. 11. First, at a step 111, t is determined whether of not vehicle start is detected or a predetermined check signal is input. Here, vehicle start is detected, for example, by turn-on of an ignition switch, etc. Moreover, the predetermined check signal is a predetermined signal input at a manufacturing line of vehicles and during adjustment before shipment.

When having any of start detection and input of a check signal at a step 111, flow proceeds to a step 112 where it is determined whether or not braking is carried out. If braking is not carried out, flow proceeds to a step 113 where map correction is carried out. It is noted that the presence or absence of implementation of braking may be determined by detection whether or not a brake switch is turned on, or it may be determined, in the structure with a pressure sensor arranged in a brake circuit, based on a detection value thereof.

Figure 12:
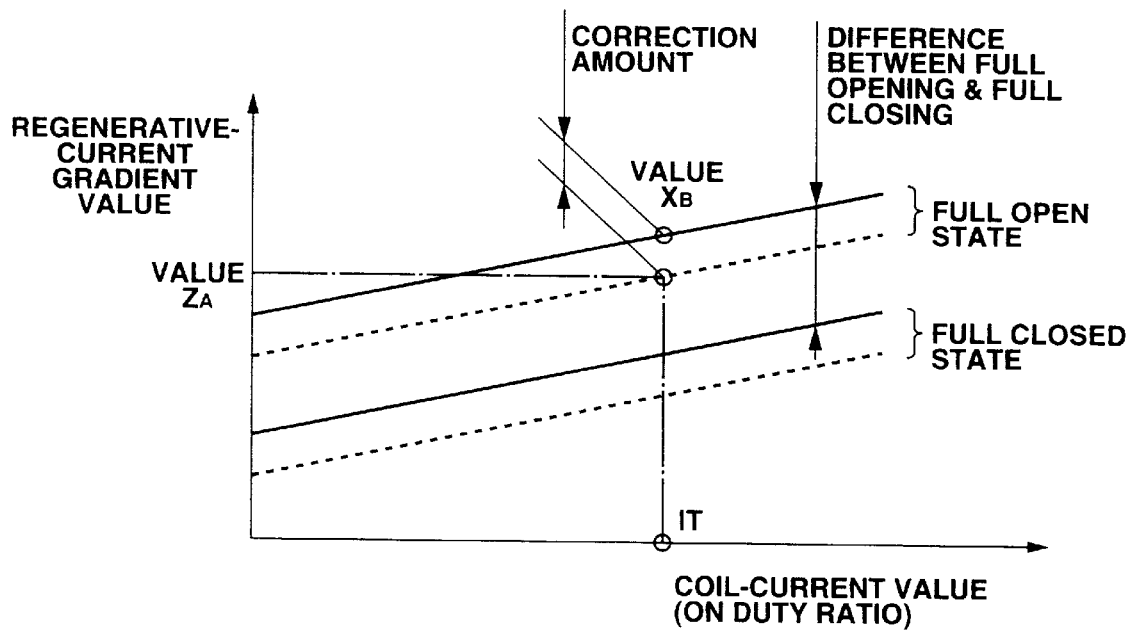
FIG. 12 is an explanatory view of the embodiment 3.

Next, using FIG. 12, a description will be made with regard to map correction carried out at the step 113. Upon this correction, a current IT of a predetermined duty ratio is output to the solenoid valve 300 so as to a gradient value $Z_A$ of the regenerative current thereof. In the embodiment 3, this current IT is used for measurement upon full opening. In this case, a gradient value $X_B$ corresponding to the current IT is determined in the characteristic map of regenerative current as previously input. On the other hand, if the detected gradient value $Z_A$ is different from the set gradient value$Z_B$ as illustrated in the drawing, the map is shifted by a difference thereof. Specifically, an initial characteristic as previously input and shown by solid line in the drawing is shifted downward by a difference as shown by broken line in the drawing. Thus, thereafter, upon control shown in FIGS. 7–9 as illustrated in the embodiments 1 and 2, control is carried out based on this corrected characteristic map of regenerative current.

The embodiment 3 configured as mentioned above produces the following effect and operation:

The solenoid valve 300 has dispersed attraction force with respect to current passing therethrough in accordance with the coil winding state. Moreover, the regenerative-current formation circuit 501 and the regenerative-current detection circuit 504 also have dispersed detection of regenerative current due to dispersion of characteristics of the structures. This results in dispersion of the relationship between a value of current passing through the solenoid valve 300 and the plunger position.

Then, if the gradient value $Z_A$ of the regenerative current detected when providing, upon shipment, a check signal to pass the current value IT for checking is shifted from a value as previously input in the characteristic map of regenerative current, the map is shifted by a difference thereof, enabling achievement of high detection accuracy without being affected by the above dispersion. Moreover, since this correction is carried out for each solenoid valve 300, higher detection accuracy is obtained.

Further, the plunger position is shifted with respect to a current value due to deterioration of the solenoid valve 300 with time such as wear of the sheet face 302 and the plunger 303. In such case, correction of the above map is carried out every start to allow preservation of high detection accuracy. In this connection, said correction may be omitted upon shipment, and be carried out every start.

Embodiment 4

The embodiment 4 corresponds to the invention as depicted in claims 4, 5, 9, 10 and 11, and is a partly altered variant of the embodiment 2 wherein calculation processing of a gradient value of the regenerative current carried out at the step 92 differs from that one in the embodiment 2.

Specifically, in the embodiment 4, when calculating the gradient value Z, a plurality of response waveforms of the regenerative current obtained in a single control cycle are subjected to averaging processing so as to obtain the gradient value Z. And when carrying out averaging processing, different weighting, i.e. coefficient is applied to the initial stage and the late stage in a single control cycle.

A detailed description will be made with regard to this.

Figure 13:
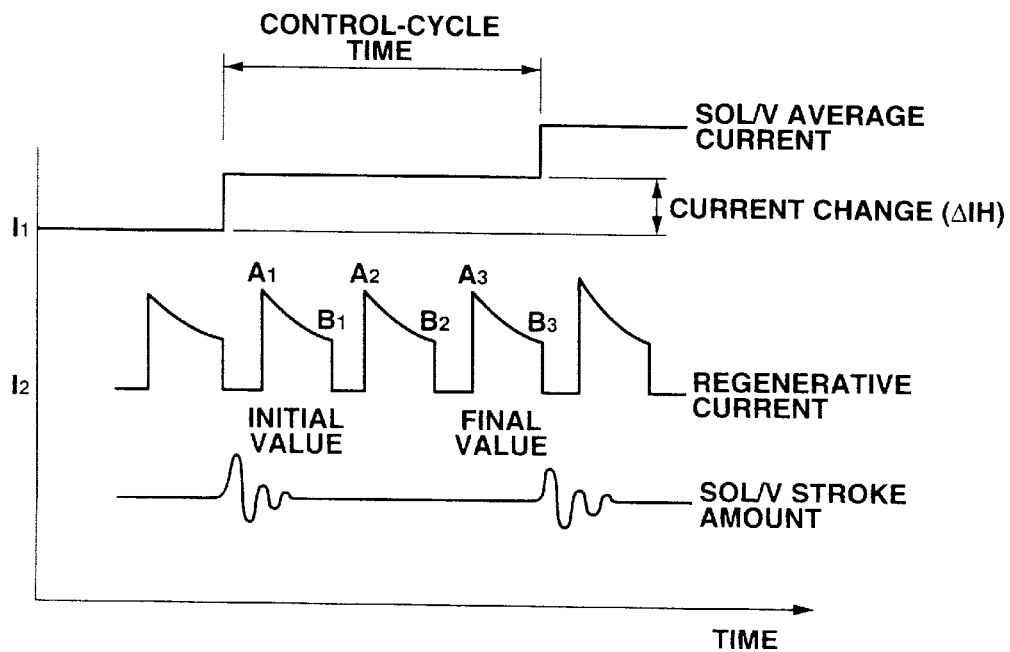
FIG. 13 is a time chart explaining the embodiment 4.

FIG. 13 shows the relationship between the drive current $I_1$ and the regenerative current $I_2$. In a single control cycle, n regenerative currents $I_2$ are detected in accordance wit the frequency of output current. In this embodiment, n=3 is given. However, a value of n is not limited thereto, and may be, of course, in the order of n=100–300.

Here, the gradient value Zn of each regenerative current is calculated by operation of Zn=An–Bn. In the embodiment 4, in providing weighting to those values, averaging processing for calculating an average value is carried out based on the following equation:

Average value=$\{(K^*(A1-B1)+K2^*(A2-B2)+K3^*(A3-B3))/n-T$ wherein Kn is a weighting coefficient, and T is a number of data from the start, which are determined in accordance with a current variation $\Delta IH$ of the drive current $I_1$ as shown in (a) and (b) in FIG.14. First, with the number T of data from a start value, processing is carried out as shown in FIG. 14(a) such as T=0 when the current variation $\Delta IH$ is little or very small, and T=1 and T=2 when the current variation $\Delta IH$ becomes greater. Moreover, with the coefficient Kn, processing is carried out as shown in FIG. 14(b) such as K1=0, K2=1, and K3=2 if T=0, and K1=0, K2=0, and K3=1 if T=1. That is, a gradient value Z1 obtained from a first regenerative-current response waveform in a single control cycle is removed from average-value data as a stroke of the plunger is not stabilized. And an average value is obtained based on gradient values Z2, Z3 obtained from a second regenerative-current response waveform and the subsequent. On the other hand, when the current variation $\Delta IH$ is large, the gradient value Z2 obtained from the second regenerative-current response waveform is also removed for the same reason. And processing is carried out with the gradient value Z3 as an average value, which is obtained from the third regenerative-current response waveform.

Next, the operation and effect of the embodiment 4 will be described.

When the solenoid valve 300 is actuated based on PWM control, the plunger 303 is not always stably positioned at the middle opening degree, and may have a fine stroke. Moreover, when changing the valve opening degree, i.e. the position of the plunger 303, the plunger 303 does not finish moving instantaneously, but needs a time for movement, particularly, when an amount of movement is greater. And a response lag occurs for the regenerative current produced in accordance with this.

On the other hand, in the embodiment, when detecting the position of the plunger 303 based on the regenerative current, the gradient value Zn obtained in a single control cycle is averaged to obtain the gradient value Z, so that even if the positions of the plunger 303 are dispersed in a fine way, the position can be detected with high accuracy without being affected thereby.

Further, if, when moving the plunger 303, its amount of movement, i.e. the current variation $\Delta IH$ is great, an average value is calculated to correspond to this magnitude, in removing data of the gradient value Zn obtained for the first time or up to the second time and in relying upon the remainder data. Therefore, an inaccurate gradient value of the moving plunger 303 may not be included in an average value, enabling detection of the position of the plunger 303, i.e. the valve opening degree with high accuracy.

The embodiment 4 has been described with regard to an example of the frequency of a single control cycle of n=3. The frequency n only needs to two or more, and is not limited to 3, and may be a value of 100 or more as described above. In such a way, when a value of n is large, alleviation of weighting of the coefficient Kn may be carried out not only for the first time, but for in the order of ⅓ of n, for example. Moreover, the embodiment 4 showed two values of 0 and 1 as weighting of the coefficient Kn. A middle value thereof can be added to obtain divided ranges of light weighting, middle weighting, and heavy weighting.

Embodiment 5

The embodiment 5 corresponds to the invention as depicted in claim 12, and relates to a technique when the frequency is increased in PWM control.

Increasing the control frequency is possible as one of the means for enhancing the control quality. Specifically, when carrying out PWM control, a stroke of the plunger 303 can produce a pulse pressure or abnormal noise called cry at the coil of the solenoid valve 300. For solving this, it is possible to output a PWM signal at the frequency of 20 KHz or more, for example. However, when outputting the coil current I1 at high frequency in this way, operation of the gradient value Zn of each response waveform of the regenerative current I2 requires high-speed processing means, resulting in cost increase.

The embodiment 5 is an example of calculating the gradient value Z by low-cost and low-speed processing means even at increased control frequency.

Specifically, the gradient value Z is obtained at the step S22 for calculating the plunger position in the embodiment 1 in the same way as in this embodiment. In the embodiment 5, the gradient value Z is operated across a plurality of response waveforms as shown in FIG. 15. That is, the gradient value Z is obtained from values of a waveform at two points of A and B as described above. In the embodiment, the gradient value Z is obtained from a value An of one waveform at a point A and a value Bn+1 or Bn+2 of the following response waveform or the subsequent waveform at a point B.

As described above, in the embodiment 5, the gradient value Z is calculated based on values obtained across a plurality of response waveforms, thus enabling calculation of the gradient value Z even with implementation of PWM control of high frequency or the use of low-cost means with the processing speed being not especially high. Therefore, though with low-cost means, an improvement can be achieved in the control quality as well as the control accuracy due to calculation of the gradient value Z.

In connection with a description of the embodiment 5, FIG. 15 shows an example of calculation of the gradient value Z across the response waveforms 2 or 3. The number of response waveforms is not limited to that one in the embodiment, i.e. it may suitably be determined in view of the output frequency for PWM control and the processing speed of the control unit 50. By way of example, if a desirable time required for calculation of the gradient value Z is preset, the gradient value may be calculated across the number of waves of regenerative current produced within the preset time.

Embodiment 6

The embodiment 6 corresponds to the invention as depicted in claim 13, and is characterized in that when calculating the plunger position as shown at the step S22 in the embodiment 1, correction is carried out based on the coil temperature and the battery voltage.

Figure 16:
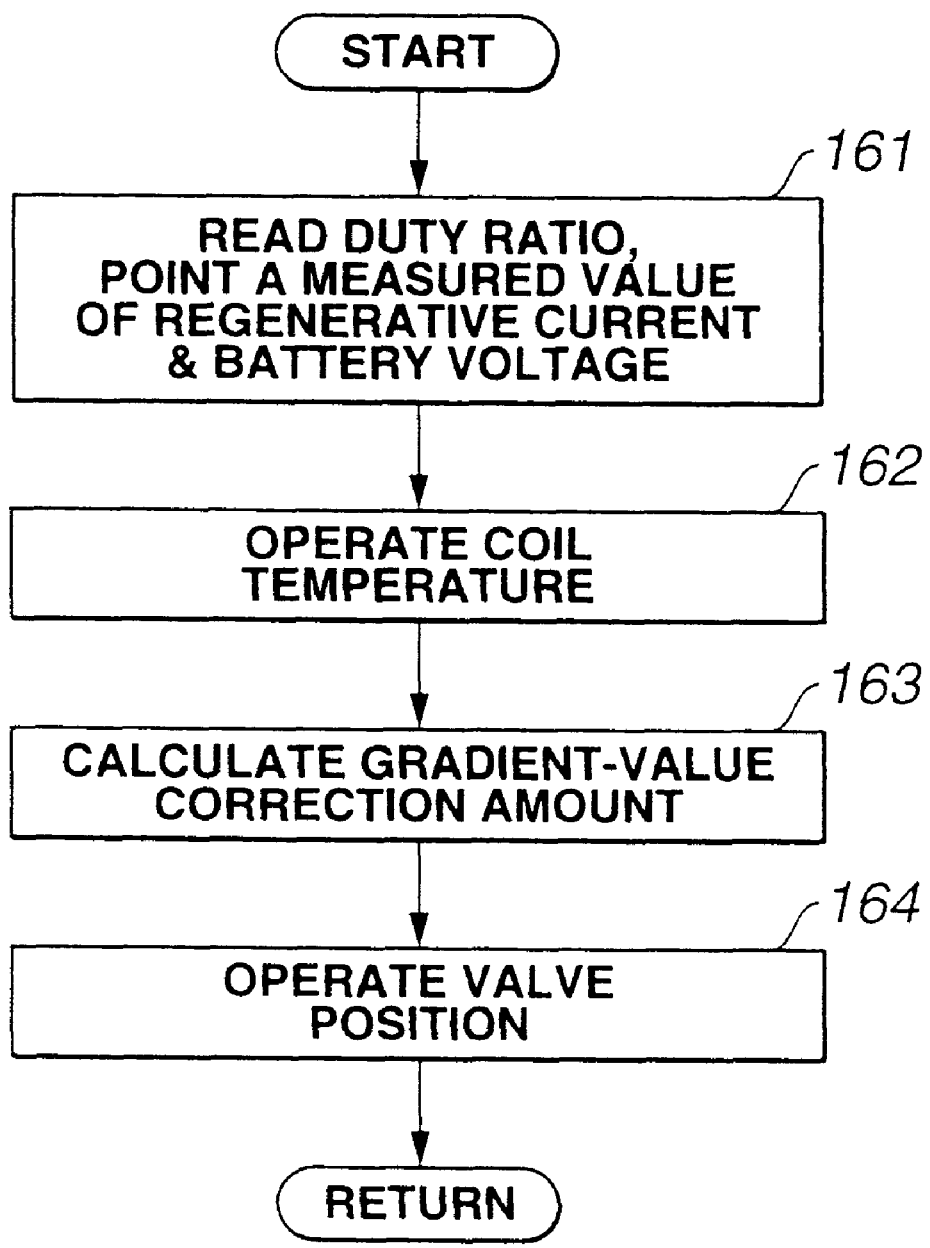
FIG. 16 is a flow chart showing control flow of plunger-position detection in the embodiment 6.

FIG. 16 is a flow chart showing flow of only part of calculation of the plunger position in the embodiment 6.

At a step 161, read are the output duty ratio in a control target cycle, a measurement value of a regenerative-current waveform at the point A (refer to FIG. 10), and the battery voltage based on input out of a battery-voltage sensor, not shown.

Figure 17:
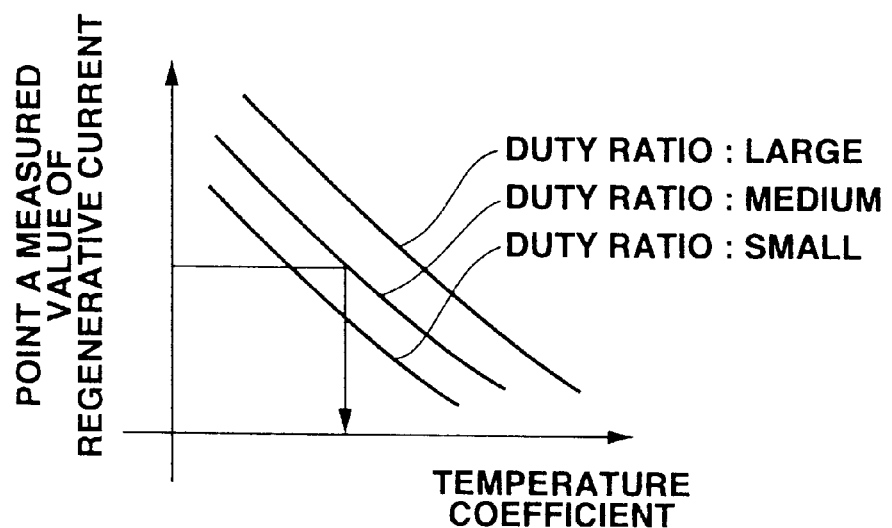
FIG. 17 is a characteristic view of the embodiment 6.

At a subsequent step 162, the coil temperature is obtained. It is noted that the coil temperature is a temperature of the coil 305 of the solenoid valve 300, which is obtained as follows. First, a temperature coefficient is obtained from a characteristic view of regenerative current vs. temperature coefficient as shown in FIG. 17 and based on a measurement value at the point A and the duty ratio. It is noted that in this characteristic view, the duty ratio is divided into three, i.e. large, medium and small magnitudes.

Figure 18:
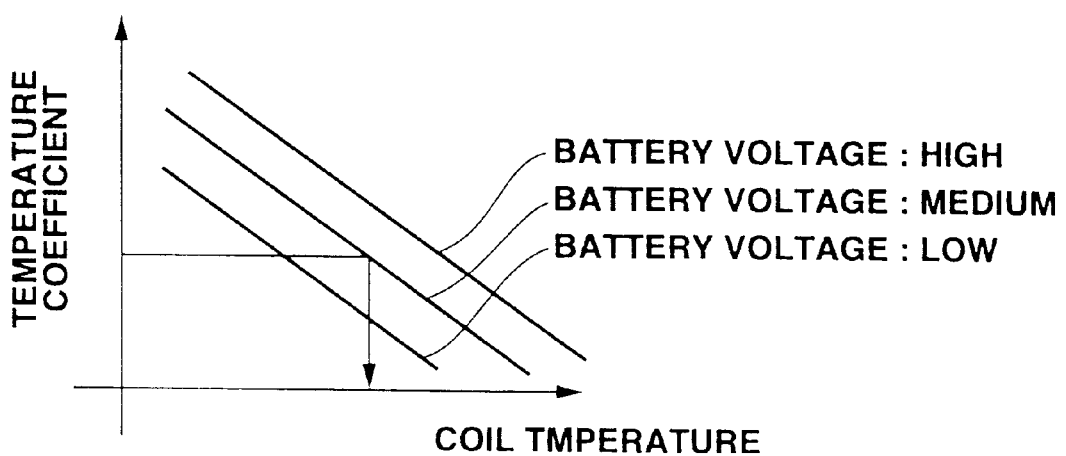
FIG. 18 is a characteristic view of the embodiment 6.

Next, the coil temperature is obtained from a characteristic view of temperature coefficient vs. coil temperature as shown in FIG. 18 and based on a temperature coefficient and a battery voltage. It is noted that in this characteristic view, the battery voltage is divided into three, i.e. high, medium and low magnitudes.

The characteristic views in FIGS. 17 and 18 show the relationships between a value of regenerative current at the point A and a coil temperature based on a difference between the duty ratio and the battery voltage by means of a map, which may alternately be shown by means of a function. Moreover, they may be replaced with a map (or a function) based on a value of regenerative current at the point B.

Figure 19:
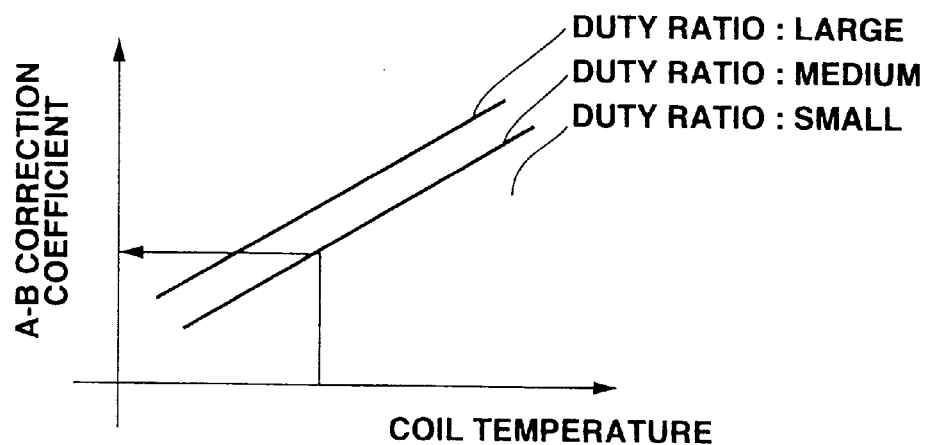
FIG. 19 is a characteristic view of the embodiment 6.
Figure 20:
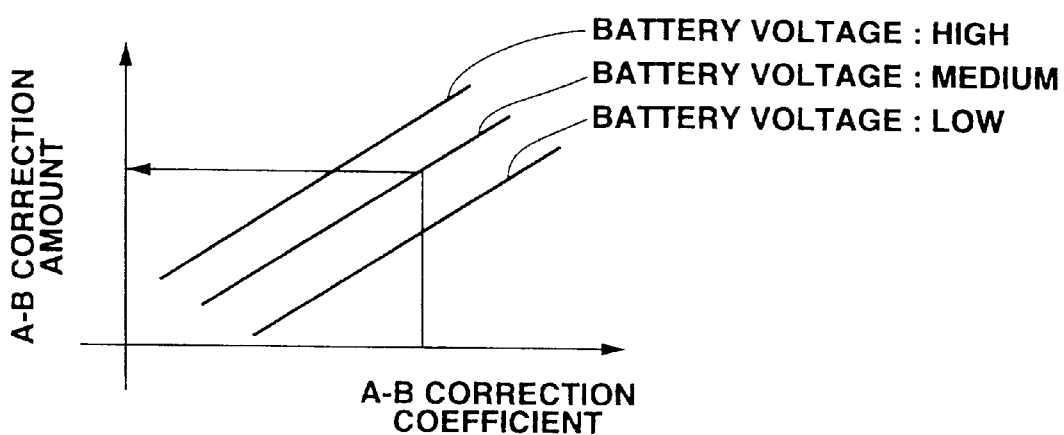
FIG. 20 is a characteristic view of the embodiment 6.

Next, flow proceeds to a step 163 where a correction amount of the gradient value of regenerative current is calculated. Here, first, a correction coefficient is obtained from a characteristic view of coil temperature vs. correction coefficient as shown in FIG. 19 and based on the coil temperature obtained at the step 162 and the duty ratio. Next, a correction amount is obtained from a characteristic view of correction coefficient vs. correction amount as shown in FIG. 20 and based on the correction coefficient and the battery voltage. It is noted that FIGS. 19 and 20 show the relationships between a coil temperature and a gradient value of regenerative current based on a difference between the duty ratio and the battery voltage by means of a map (or a function).

Next, flow proceeds to a step 164 where the plunger position is calculated. In the embodiment, correction of the gradient value Z is carried out by adding/subtracting the correction amount obtained at the step 163 to/from the obtained gradient value Z, and then the plunger position is obtained in the same way as in the embodiment 2.

Next, the operation and effect of the embodiment 6 will be described.

Figure 21:
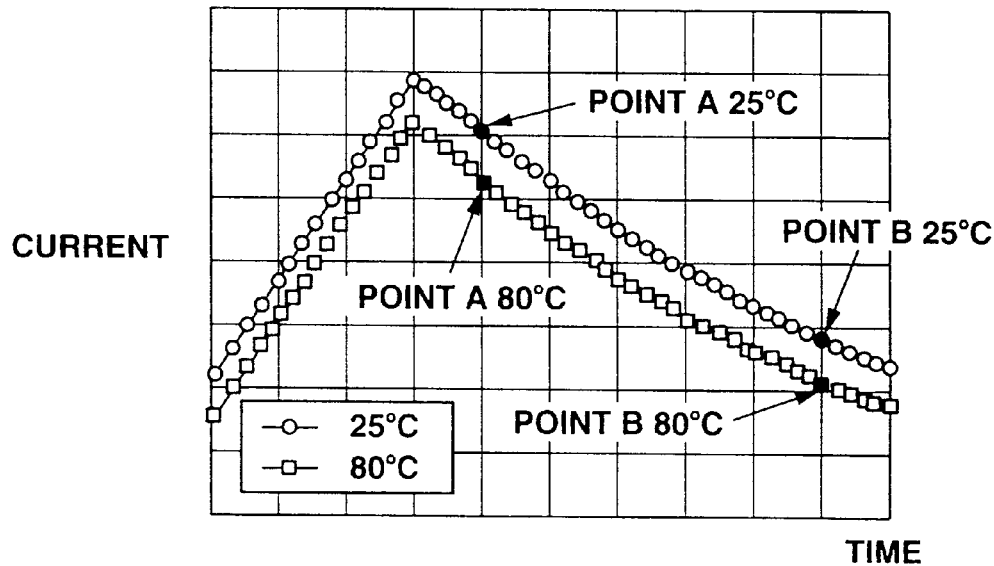
FIG. 21 is an explanatory view of operation in the embodiment 6.

When energization results in a temperature rise of the coil 305 in the solenoid valve 300, a coil resistance is increased to decrease a current value of regenerative current. FIG. 21 shows one of the examples, from which it can be seen that in response waveforms of regenerative current for the coil temperatures of 25° C. and 80° C., the waveform at 80° C. is lower. Similarly, when the battery voltage varies, a current value also varies with it.

On the other hand, in the embodiment 6, even if a current value of regenerative current varies due to a variation in the coil temperature or the battery voltage, this variation part is calculated as a correction value based on a measurement value of regenerative current at the point A, the duty ratio and the battery voltage, which is added/subtracted to/from the gradient value Z obtained from the regenerative current, enabling accurate determination of the plunger position without being affected thereby.

Embodiment 7

The embodiment 7 corresponds to the invention as depicted in claim 14, and relates to correction control at part of the control unit 50 for carrying out control of outputting the drive current $I_1$ to the coil 305.

Figure 22:
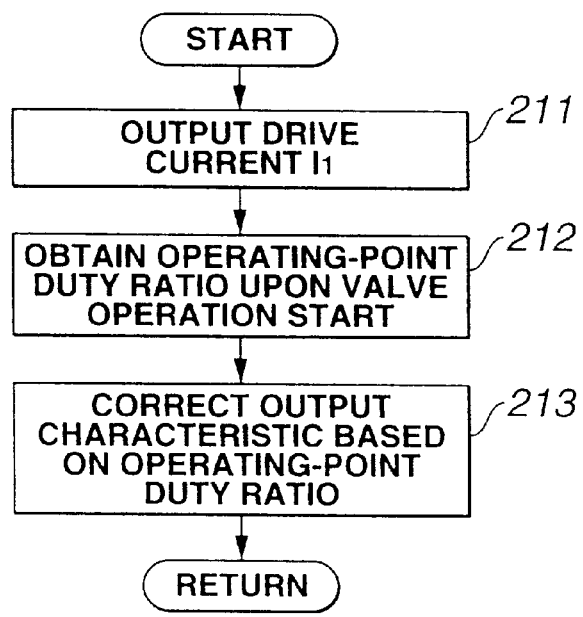
FIG. 22 is a flow chart showing flow of output correction control in the embodiments.

This embodiment 7 carries out output correction control as shown in the flow chart in FIG. 22 upon shipment and upon start in the same way as the invention as depicted in claim 8. In this output correction control, first, at a step 211, the drive current $I_1$ is output in being gradually increased from 0.

Figure 23:
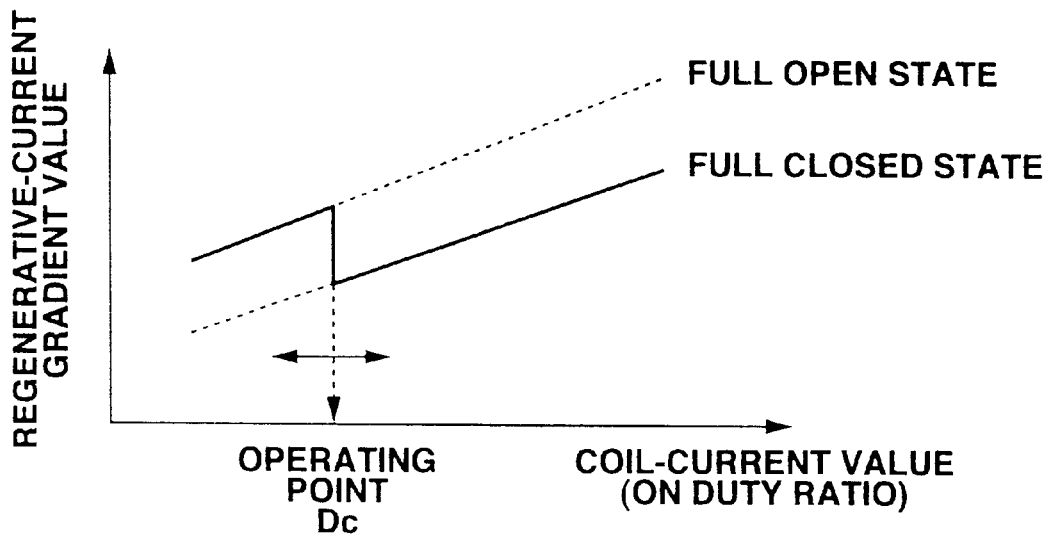
FIG. 23 is a characteristic view showing a variant of a gradient value in the embodiment 7.

Next, at a step 212, an operating-point duty ratio Dc is obtained based on the gradient value Z of regenerative current, which is the duty ratio at the moment when the plunger 303 of the solenoid valve 300 starts moving from the full-open position. FIG. 23 shows a variant of the gradient value Z when increasing the drive current $I_2$. In this way, it is obtained the duty ratio when the gradient value Z varies from the full open state to the full closed state.

Figure 24:
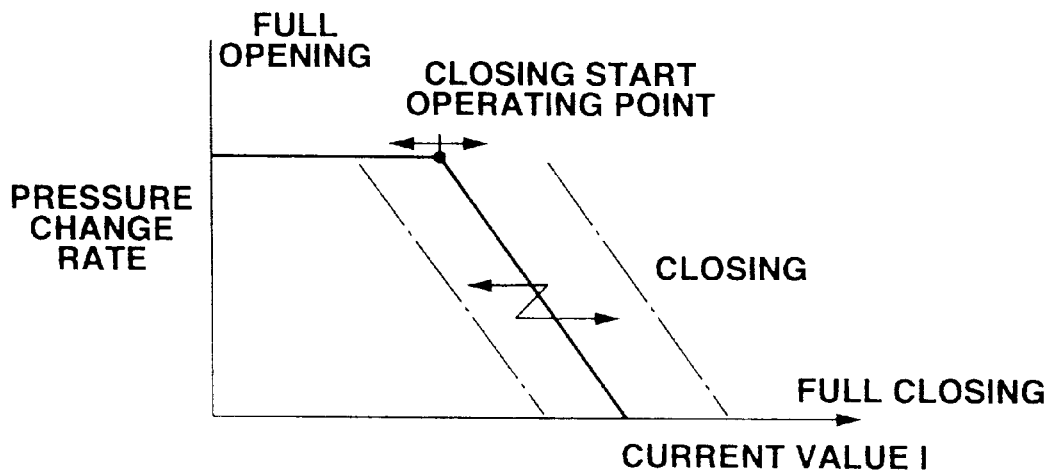
FIG. 24 is an output characteristic map in the embodiment 7.

Next, at a step 213, an output characteristic is corrected based on the operating-point duty ratio Dc. In this connection, this correction is possible by altering a gain to be multiplied by a control signal or by shifting an output characteristic map as shown in FIG. 24.

Therefore, in the embodiment 7, even if the solenoid valves 300 have the operating characteristics dispersed respectively due to assembling error of the solenoid valves 300, winding error of the coils 305, etc., or varied due to their deterioration with time, correction of the output characteristic upon shipment and upon start as described above ensures correction of the above respective performance dispersions to obtain uniform operating characteristic, resulting in achievement of the effect of possible improvement in the control accuracy.

Embodiment 8

The embodiment 8 corresponds to the invention as depicted in claims 15 and 16, and is characterized in that the control responsibility is enhanced by carrying out correction upon output of the drive current $I_1$.

Figure 25:
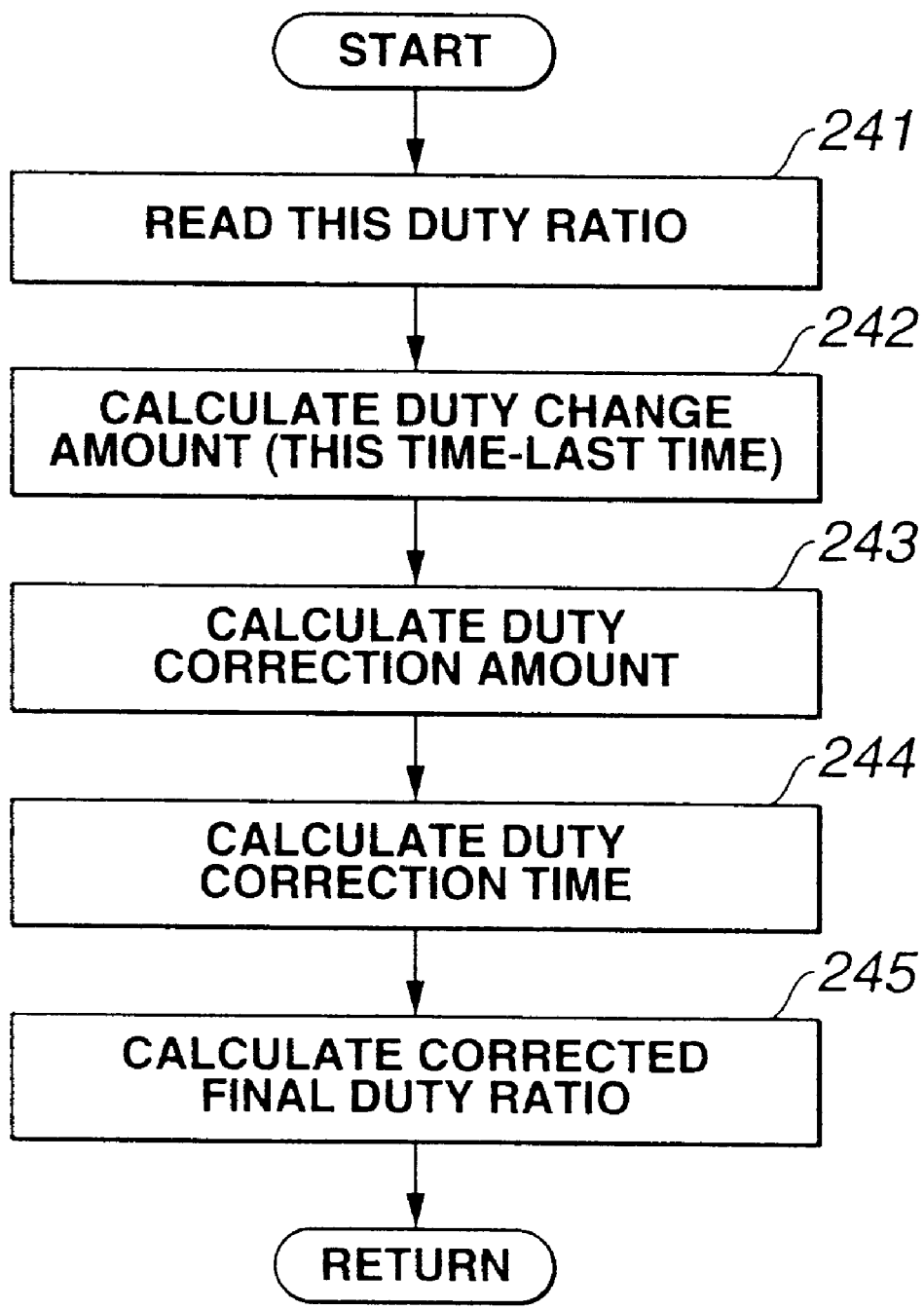
FIG. 25 is a flow chart showing control flow of alteration start correction carried out in the embodiment 8.

FIG. 25 is a flow chart showing control flow of correction upon alteration start, which is carried out in the embodiment 8. At a step 241, the duty ratio to be output in this control cycle (which is referred to as reference duty ratio) is read. It is noted that this duty ratio is determined based on amounts of pressure reduction and pressure increase of the required fluid pressure, for example, at the steps S8 and S9 included in fundamental control in FIG. 7 as illustrated in the embodiment 1.

Figure 26:
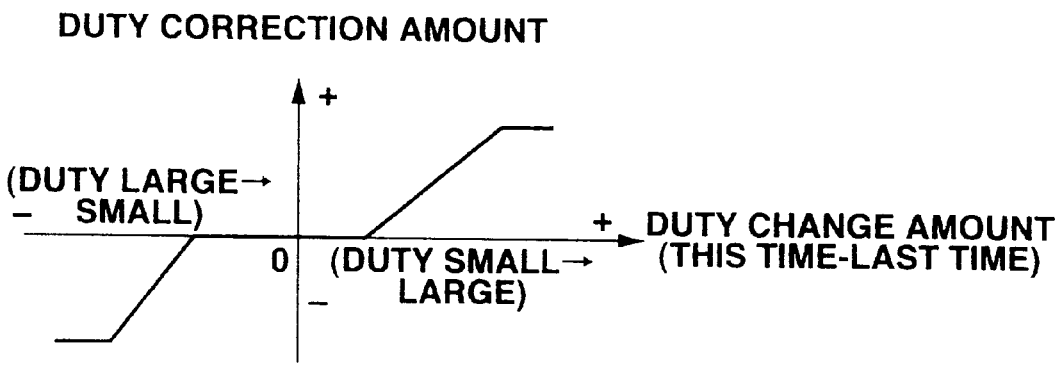
FIG. 26 is a characteristic view of a correction amount in the embodiment 8.

Next, at a step 242, a duty variation is calculated, which is a difference between this duty ratio and the duty ratio in the last control cycle. At a subsequent step 243, a correction amount is determined based on a characteristic view of a correction amount as shown in FIG. 26 and in accordance with the duty variation. As for this correction-amount characteristic, within the range of small duty variation, correction is not carried out, and if the duty variation is greater than it, a correction amount is increased in proportion to the duty variation until the variation reaches a predetermined value. If the variation exceeds the predetermined value, a correction amount is set to a given upper limit.

Figure 27:
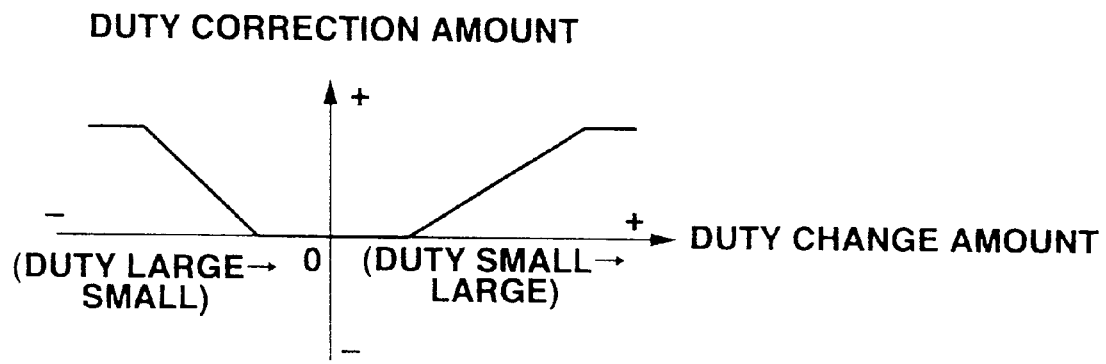
FIG. 27 is a characteristic view of a correction time in the embodiment 8.

Next, at a step 244, a duty-correction time is calculated, which is a time having the above correction amount added. This duty-correction time is determined by the duty variation as is illustrated in a characteristic view of a correction time shown in FIG. 27. within the range of small duty variation, a correction time is 0, i.e. correction is not carried out, and if the duty variation is greater than it, a correction time is increased in proportion to the duty variation until the variation reaches a predetermined value. If the variation exceeds the predetermined value, a correction time is set to a given upper limit.

Next, at a step 245, a final duty ratio is calculated, which is the duty ratio having a correction amount added. Specifically, within the range of a correction time, the final duty ratio is equal to the reference duty ratio plus a correction amount. Moreover, beyond the range of a correction time, the final duty ratio is equal to the reference duty ratio. The final duty ratio obtained in such a way is output to the solenoid 300.

Next, the operation and effect of the embodiment 8 will be described.

Figure 28:
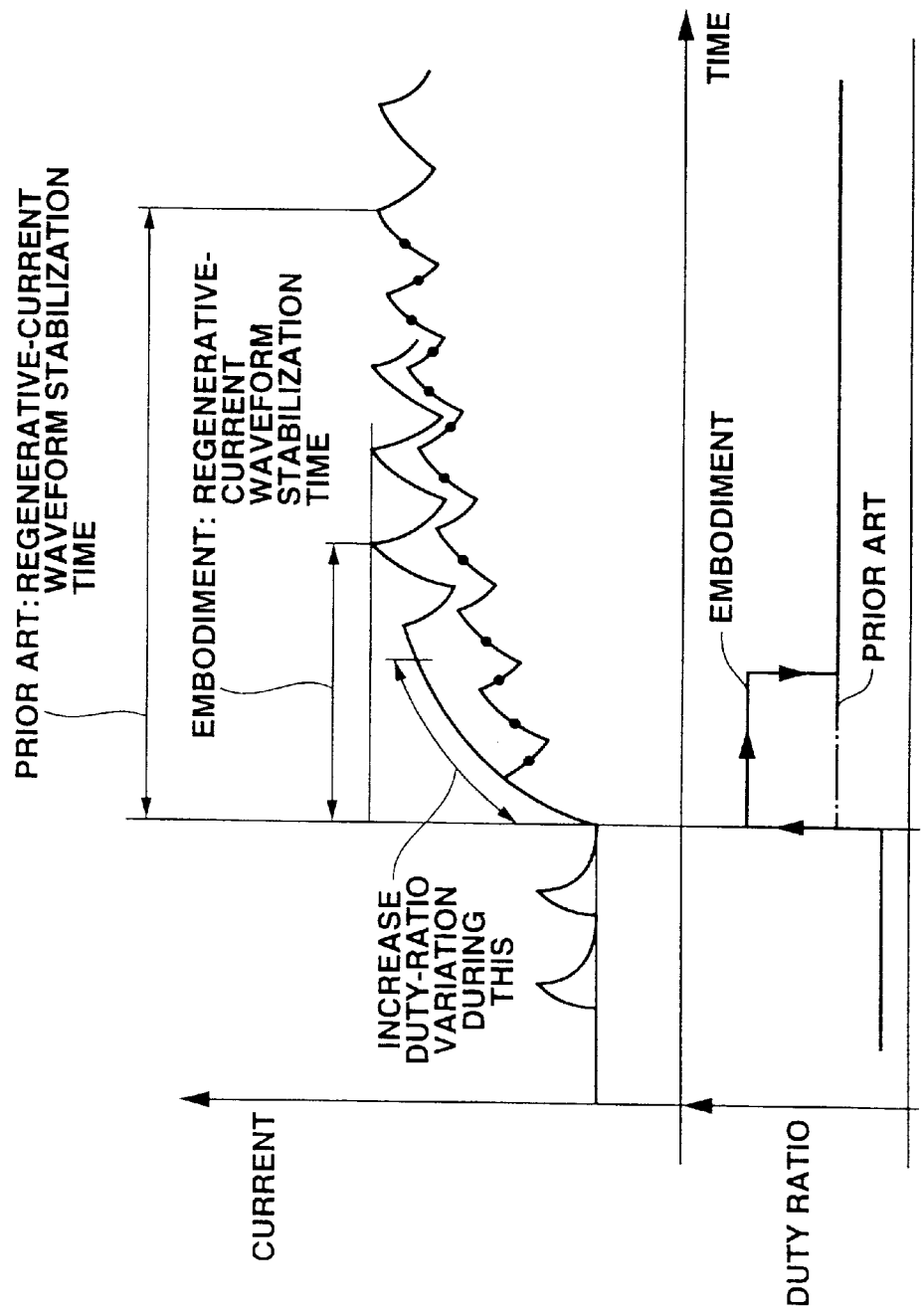
FIG. 28 is a time chart illustrating operation in the embodiment 8.

FIG. 28 is a drawing of comparison of execution and inexecution of correction upon alteration start in the embodiment 8 when a target duty ratio is altered to a higher value than the last value in this control cycle. In the drawing, solid line shows a case of executing correction upon alteration start, and chain line shows a prior art of not executing correction upon alteration start. In the case of the prior art, in one control cycle, the drive current $I_1$ is uniformly output, having the reference duty ratio corresponding to the target duty ratio. In this case, a regenerative-current waveform needs a time until it reaches a value corresponding to a target plunger position, which is referred here to as a regenerative-current stabilizing time. During this regenerative-current stabilizing time, a regenerative-current waveform does not correspond to the position of the plunger 303, resulting in impossible accurate detection of the plunger position based on the regenerative-current waveform.

On the other hand, in the embodiment 8, when altering the target duty ratio, at the initial stage, a value having a duty correction amount added is output temporally. As a result, a regenerative-current stabilizing time is shortened, so that a regenerative-current waveform rises to a value corresponding to the target duty ratio in a short period of time. Therefore, a time band is shortened, in which the plunger position cannot be detected accurately, obtaining the effect of possible improvement in the control responsibility and the control accuracy.

Embodiment 9

The embodiment 9 corresponds to the invention as depicted in claims 20–22, and is characterized in that rise correction is carried out, which corrects a gain to be multiplied by the target duty ratio when controlling the wheel-cylinder pressure from preservation to pressure increase.

Figure 29:
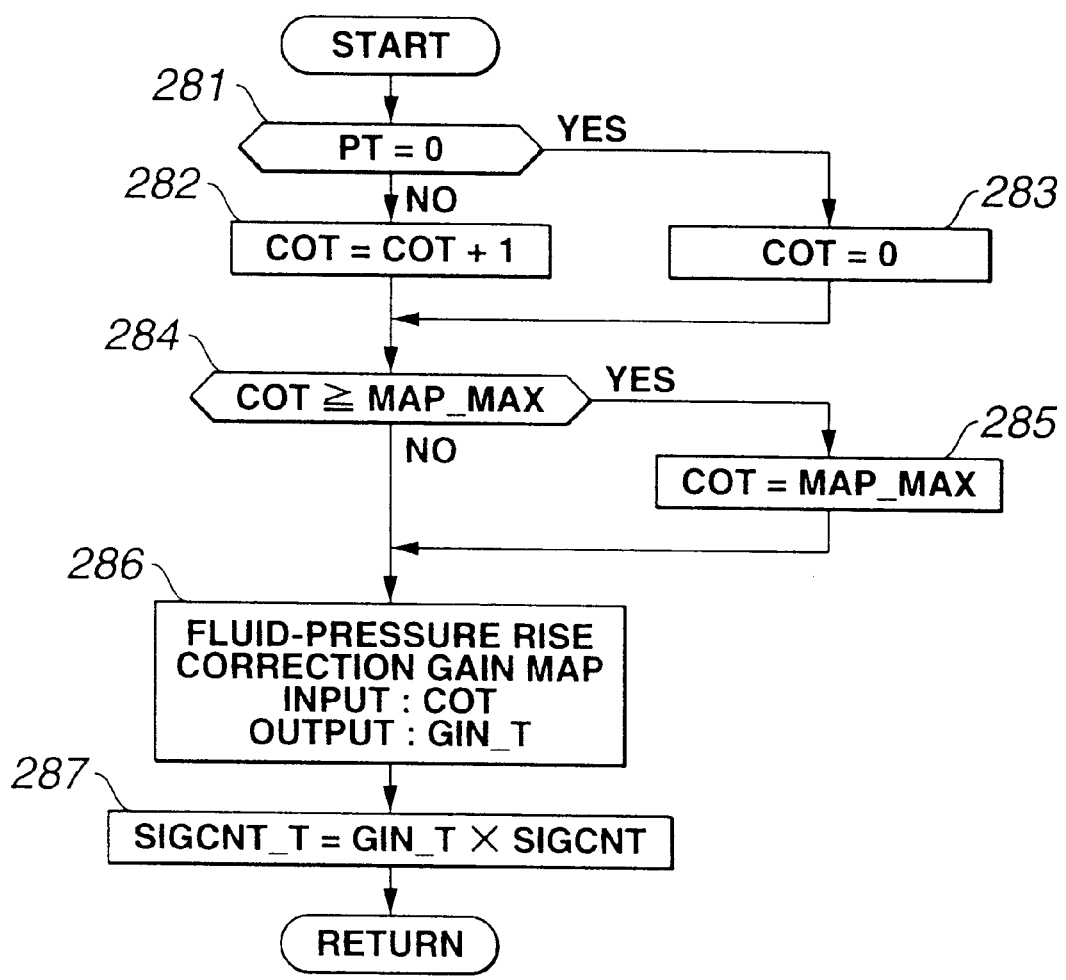
FIG. 29 is a flow chart showing control flow of rise correction in the embodiment 9.

This rise correction will be described according to the flow chart in FIG. 29.

First, at a step 281, it is determined whether or not a target pressure PT is 0. If the target pressure PT is 0, flow proceeds to a step 283, whereas if the target pressure PT is not 0, flow proceeds to a step 282. It is noted that the target pressure PT=0 indicates preservation, and the target pressure PT≠0 indicates pressure increase.

At a step 282, a count value COT of a counter is increased, while at a step 283, the count value COT of the counter is cleared to 0.

At a step 284, it is determined whether or not the count value COT of the counter exceeds a preset maximum correction time MAP_MAX. When exceeding it, flow proceeds to a step 285 where processing is carried out such that COT=MAP_MAX.

Figure 30:
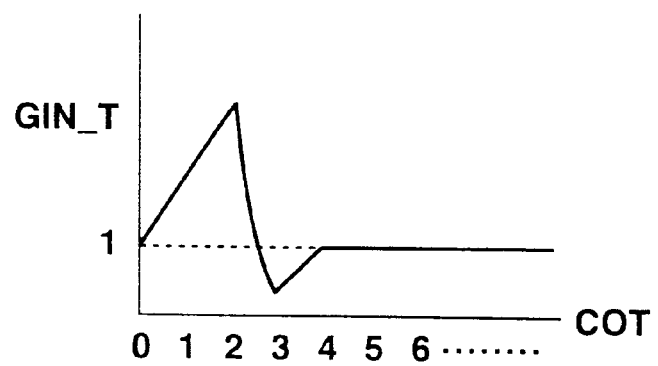
FIG. 30 is a map of hydraulic-pressure rise correction in the embodiment 9.

At a step 286, referring to a map of fluid-pressure rise correction map as shown in FIG. 30 a gain GIN_T is determined in accordance with the count value COT of the counter. As for this gain GIN_T, as shown in FIG. 30, first and second outputs of the gain GIN_T are determined to be a value greater than 1, and a third output of the gain GIN_T is determined to be a value less than 1, and fourth (MAP_MAX) and subsequent outputs are determined to be 1.

Figure 31:
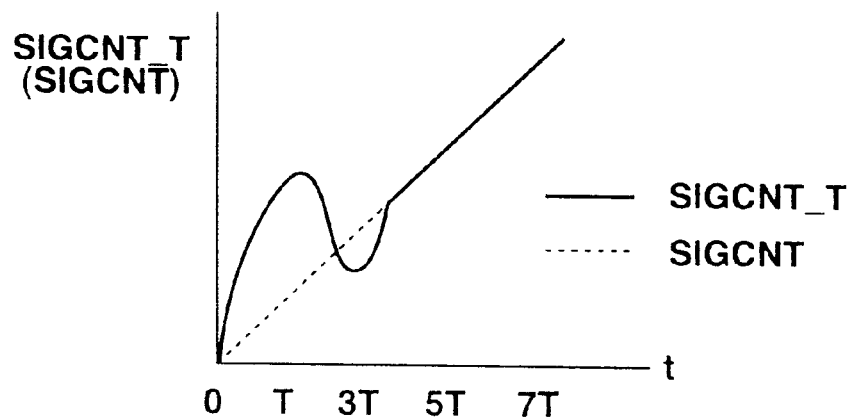
FIG. 31 is a time chart illustrating an example of output of a control signal in the embodiment 9.

At a step 287, an after-correction control signal SIGCNT_T is obtained. This is obtained by multiplying a control signal SIGCNT by the gain GIN_T. This after-correction control signal SIGCNT_T as shown by solid line in FIG. 31 is higher than the control signal SIGCNT as shown by broken line at the initial stage. Thereafter, it has once a value lower than the control signal SIGCNT, and then the same value as the control signal SIGCNT.

Figure 32:
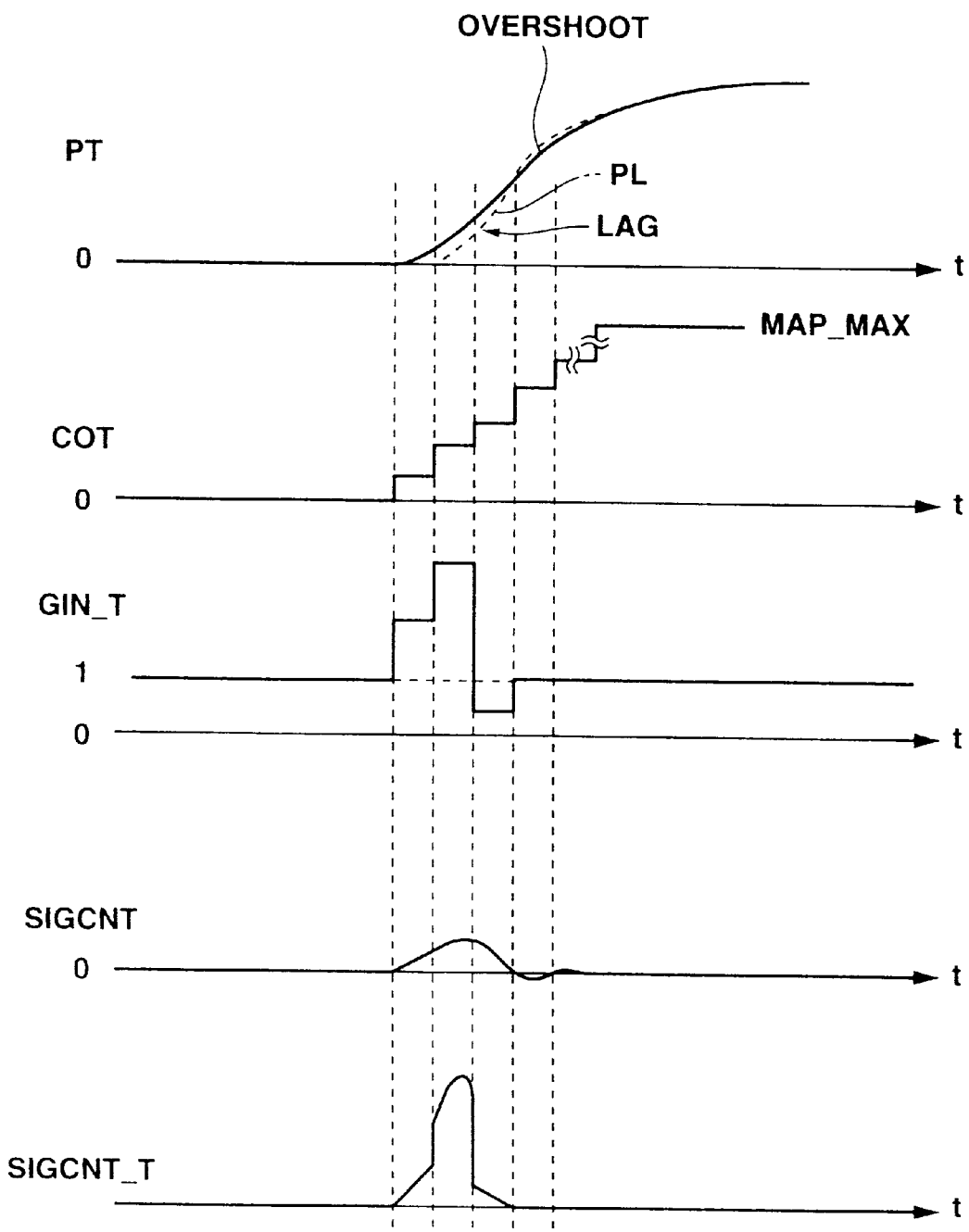
FIG. 32 is a time chart illustrating an example of operation in the embodiment 9.

Next, an example of operation of the embodiment 9 will be described according to the flow chart in FIG. 32. If rise correction to be carried out in the embodiment 9 is not carried out, during a period of time that the drive current $I_1$ is output to move the plunger 303 actually so as to carry out pressure increase, a control pressure PL is lagged in time with respect to a target pressure PT1, and produces a little overshot.

Then, rise correction in the embodiment 9 is carried out to provide a large gain by a first pulse and a second pulse, and reduce a gain by a third pulse, enabling the control pressure PL to correspond to the target pressure PT.

As described above, the embodiment 9 produces the effect of allowing a reduction in a rise lag of the actual control pressure PL to obtain high control accuracy.

Having described the embodiments in detail in accordance with the drawings, the specific structure is not limited to that one in the embodiments, and the present invention may include changes of the design, etc. without departing from the gist of the present invention. By way of example, in the embodiments, the example was given wherein the present invention is applied to a brake-fluid pressure controller for carrying out ABS control for preventing wheel lock during braking. The present invention may be applied to control for restraining slip of driving wheels, control for providing a braking force, when the cruising condition falls in excessive oversteer or excessive understeer, to produce a yaw moment in a vehicle in the direction to restrain or prevent it, or braking control in automatic cruising control, or a brake controller which allows implementation of brake-by-wire braking control wherein a brake pedal and the brake-fluid pressure are not connected directly.

Moreover, in the embodiments, the example was given wherein the solenoid valve 300 is applied to the pressure-increase side solenoid valves 33–36. Alternately, it is applicable to other solenoid valves such as the pressure-reduction side solenoid valves 43–46. Further, the solenoid valve for switching full opening and full closing can be applied to the entire art for PWM control. Furthermore, in the regenerative-current formation circuit 501, the means for limiting the direction of current passage to the direction of the regenerative current $I_2$ are not limited to a diode.

What is claimed is:

1. A solenoid-valve controller provided with a solenoid valve which is switchable between the full closed state where a plunger abuts on a sheet face and the full open state where the plunger separates from the sheet face, and control means for carrying out energization to a coil for driving the plunger of the solenoid valve by pulse width modulation control, characterized in that there are arranged regenerative-current formation means for forming a regenerative current in parallel with said coil, that said control means are arranged with regenerative-current detection means for detecting the regenerative current, and that said control means carry out said pulse width modulation control based on a detection value of the regenerative-current detection means.

2. The solenoid-valve controller as specified in claim 1, characterized in that said control means are provided with an opening-degree determination part for determining a position of the plunger with respect to said sheet face based on a response waveform of the regenerative current.

3. The solenoid-valve controller as specified in claim 2, characterized in that said control means are provided with an output-value correction part for correcting an output value of the pulse width modulation control in accordance with the position of the plunger determined in the opening-degree determination part.

4. The solenoid-valve controller as specified in claim 2, characterized in that said opening-degree determination part determines the plunger position based on a comparison between a regenerative-current characteristic corresponding to the response waveform of the regenerative current when the solenoid valve is in the full open state and the response waveform of the regenerative current when the solenoid valve is in the full closed state, and the response waveform of the detected regenerative current.

5. The solenoid-valve controller as specified in claim 4, characterized in that said opening-degree determination part is such that the regenerative-current characteristic used in plunger-position determination is previously provided as a characteristic map of the regenerative current.

6. The solenoid-valve controller as specified in claim 4, characterized in that said opening-degree determination part carries out characteristic-map correction for correcting said characteristic map of the regenerative current based on the response waveform of the regenerative current obtained when outputting a preset predetermined duty ratio in the state of no load resulting from the fluid pressure.

7. The solenoid-valve controller as specified in claim 6, characterized in that said opening-degree determination part carries out characteristic-map correction when detecting start of the apparatus.

8. The solenoid-valve controller as specified in claim 7, characterized in that said opening-degree determination part carries out characteristic-map correction when inputting a predetermined signal upon shipment in addition to upon start of the apparatus.

9. The solenoid-valve controller as specified in claim 5, characterized in that said characteristic map of the regenerative current is a map illustrating a gradient value from rise to fall of the regenerative current when the solenoid valve is in the full open state and a gradient value from rise to fall of the regenerative current when the solenoid valve is in the full closed state, and that said opening-degree determination part obtains the gradient value from rise to fall of the regenerative current out of the response waveform of the regenerative current as detected, and determines the position of the plunger based on this gradient value and said characteristic map of the regenerative current.

10. The solenoid-valve controller as specified in claim 9, characterized in that, when obtaining the gradient value of the regenerative current, said opening-degree determination part carries out averaging correction wherein a value obtained by averaging processing of the gradient values corresponding to a plurality of response waveforms detected in a single control cycle is set to the gradient value.

11. The solenoid-valve controller as specified in claim 10, characterized in that, in order to carry out averaging correction, said opening-degree determination part carries out averaging processing with weighting of the gradient value obtained from the late response waveforms in the single control cycle being heavier than that of the gradient value obtained from the initial response waveforms.

12. The solenoid-valve controller as specified in claim 9, characterized in that said opening-degree determination part calculates the gradient value based on a detection value in the response waveform of the regenerative current across a plurality of periods in the single control cycle.

13. The solenoid-valve controller as specified in claim 2, characterized in that said control means are arranged with voltage detection means for detecting a battery voltage and temperature detection means for obtaining a coil temperature of the solenoid valve, and that said opening-degree determination part carries out gradient-value correction for correcting the calculated gradient value based on the detected battery voltage and coil temperature.

14. The solenoid-valve controller as specified in claim 3, characterized in that said output-value correction part calculates an operating point at which the plunger starts to operate by applying a predetermined current to the coil, and determines the output characteristic in accordance with the operating point.

15. The solenoid-valve controller as specified in claim 3, characterized in that when altering the duty ratio of the output signal output from said control means, said output-value correction part carries out correction upon alteration start for adding a correction value to a target duty ratio during a predetermined period of time from start of output of a new duty ratio.

16. The solenoid-valve controller as specified in claim 15, characterized in that said output-value correction part determines whether or not correction upon alteration start is carried out in accordance with an amount of deviation between this duty ratio and the last duty ratio, and that if the amount of deviation is greater than a predetermined value, it determines to carry out correction upon alteration start.

17. The solenoid-valve controller as specified in claim 1, characterized in that said regenerative-current formation means comprise a current detection resistance connected in parallel with the coil of said solenoid valve, and back-flow prevention means arranged in series with the current detection resistance and for inhibiting energization of the current detection resistance in the direction of current passage for driving the coil, and allowing merely energization of the regenerative current in the opposite direction.

18. The solenoid-valve controller as specified in claim 17, characterized in that said back-flow prevention means are in the form of a diode.

19. A brake controller to which the solenoid-valve controller as specified in claim 1 is applied, characterized in that said solenoid valve is a valve for adjusting the brake-fluid pressure within each wheel of a vehicle, and that said control means are applied to brake control means for outputting to said solenoid valve a signal for bringing the brake-fluid pressure to a desired pressure based on a signal out of cruising-condition detection means for detecting a cruising condition of the vehicle, the signal for adjusting the brake-fluid pressure being output to the solenoid valve by said pulse width modulation control.

20. The brake controller as specified in claim 19, characterized in that it further includes target fluid-pressure calculation means for calculating a target fluid pressure of said brake-fluid pressure and a target fluid-pressure gradient which is a rate of change of a target fluid pressure per unit of time based on the cruising condition detected by said cruising-condition detection means, that said solenoid valves are arranged with a main passage which can supply to a wheel cylinder the brake-fluid pressure produced by a control fluid-pressure source independent of a brake operation fluid-pressure source for producing the brake-fluid pressure in accordance with driver's brake operation and driver's brake operation itself, and a return passage for returning brake fluid supplied to said wheel cylinder to said brake operation fluid-pressure source through a reservoir, and that when said control means increase the wheel-cylinder pressure from the preserved state, said output-value correction part carries out rise correction wherein a gain is multiplied to temporally enhance the output duty ratio with respect to a value corresponding to the target fluid-pressure gradient in the initial stage of pressure increase.

21. The brake controller as specified in claim 20, characterized in that upon implementation of rise correction, said output-value correction part gradually enhances a gain by which the output duty ratio is multiplied at the initial stage in accordance with a lapse of time, and then gradually lowers it.

22. The brake controller as specified in claim 21, characterized in that after implementation of rise correction, said output-value correction part carries out correction for temporally reducing the output duty ratio with respect to the target fluid-pressure gradient.

* * * * *